(12) United States Patent
Wang et al.

(10) Patent No.: US 11,540,187 B2
(45) Date of Patent: Dec. 27, 2022

(54) METHODS FOR ENFORCING LIMITED MOBILITY IN MOBILE NETWORK

(71) Applicant: IDAC Holdings, Inc., Wilmington, DE (US)

(72) Inventors: Guanzhou Wang, Brossard (CA); Saad Ahmad, Montreal (CA)

(73) Assignee: IDAC Holdings, Inc., Wilmington, DE (US)

( * ) Notice: Subject to any disclaimer, the term of this patent is extended or adjusted under 35 U.S.C. 154(b) by 91 days.

(21) Appl. No.: 16/930,614

(22) Filed: Jul. 16, 2020

(65) Prior Publication Data

US 2020/0351763 A1 Nov. 5, 2020

Related U.S. Application Data

(63) Continuation of application No. 16/339,048, filed as application No. PCT/US2017/055511 on Oct. 6, 2017, now Pat. No. 10,743,246.

(Continued)

(51) Int. Cl.
*H04W 36/00* (2009.01)
*H04W 36/08* (2009.01)
(Continued)

(52) U.S. Cl.
CPC ....... *H04W 36/00835* (2018.08); *H04W 8/00* (2013.01); *H04W 8/08* (2013.01);
(Continued)

(58) Field of Classification Search
CPC . H04W 36/00835; H04W 76/27; H04W 8/00; H04W 8/08; H04W 36/08;
(Continued)

(56) References Cited

U.S. PATENT DOCUMENTS 6,230,017 B1 5/2001 Anderson et al.
8,660,540 B2 2/2014 Edge et al.
(Continued)

FOREIGN PATENT DOCUMENTS

CN 101861750 A 10/2010
CN 102057726 A 5/2011
(Continued)

OTHER PUBLICATIONS

3rd Generation Partnership Project(3GPP), GP-090781, "Issues Regarding Inbound Mobility from GERAN to CSG Cells", 3GPP TSG GERAN#42, Nokia Corporation, Nokia Siemens Networks, Shenzhen, China, May 11-15, 2009, pp. 1-4.

(Continued)

*Primary Examiner* — Duc C Ho
(74) *Attorney, Agent, or Firm* — Flaster Greenberg, PC

(57) ABSTRACT

Systems, methods, and instrumentalities are disclosed for enforcing limited mobility in a mobile network. For example, a wireless transmit/receive unit (WTRU) may receive (e.g., receive from a network) a mapping of physical cell identifications (PCIs) to area identifications (AIDs). The WTRU may determine a first PCI associated with a first neighbor cell. The WTRU may determine, based on the first PCI and the PCIs to AIDs mapping, whether the WTRU is allowed to access the first neighbor cell. The WTRU may perform cell selection or reselection with the first neighbor cell as a cell selection or reselection candidate. The WTRU may perform cell selection or reselection based on the WTRU determining that the WTRU is allowed to access the first neighbor cell. The WTRU may determine that the WTRU is allowed to access the first neighbor cell based on the first PCI and the PCIs to AIDs mapping.

20 Claims, 13 Drawing Sheets

Related U.S. Application Data

(60) Provisional application No. 62/418,360, filed on Nov. 7, 2016, provisional application No. 62/405,451, filed on Oct. 7, 2016, provisional application No. 62/501,808, filed on May 5, 2017.

(51) Int. Cl.

| | | |
|---|---|---|
| *H04W 8/00* | (2009.01) | |
| *H04W 76/27* | (2018.01) | |
| *H04W 8/08* | (2009.01) | |
| *H04W 48/14* | (2009.01) | |
| *H04W 48/16* | (2009.01) | |
| *H04W 60/00* | (2009.01) | |
| *H04W 68/00* | (2009.01) | |

(52) U.S. Cl.
CPC ........... *H04W 36/08* (2013.01); *H04W 48/14* (2013.01); *H04W 48/16* (2013.01); *H04W 60/00* (2013.01); *H04W 68/005* (2013.01); *H04W 76/27* (2018.02)

(58) Field of Classification Search
CPC ..... H04W 48/14; H04W 48/16; H04W 60/00; H04W 68/005
See application file for complete search history.

(56) References Cited

U.S. PATENT DOCUMENTS

| | | | |
|---|---|---|---|
| 8,811,302 B2 | 8/2014 | Santhanam et al. | |
| 8,818,333 B2 | 8/2014 | Tian et al. | |
| 9,294,963 B2 | 3/2016 | Masini et al. | |
| 2009/0137228 A1* | 5/2009 | Horn | H04W 48/02 455/411 |
| 2010/0124179 A1 | 5/2010 | Lee et al. | |
| 2011/0281584 A1* | 11/2011 | Sander | H04W 36/00835 455/436 |
| 2012/0100856 A1 | 4/2012 | Ishida et al. | |
| 2012/0190363 A1 | 7/2012 | Maeda et al. | |
| 2013/0260740 A1* | 10/2013 | Rayavarapu | H04W 76/27 455/422.1 |
| 2014/0341041 A1* | 11/2014 | Velev | H04W 4/70 370/236 |
| 2015/0103721 A1 | 4/2015 | Yi et al. | |
| 2016/0105790 A1 | 4/2016 | Shu | |
| 2016/0183156 A1* | 6/2016 | Chin | H04L 61/2007 370/331 |
| 2017/0289898 A1* | 10/2017 | Youn | H04W 48/08 |
| 2017/0325056 A1* | 11/2017 | Mehta | H04W 4/024 |
| 2019/0090159 A1 | 3/2019 | Zhou et al. | |
| 2019/0215762 A1* | 7/2019 | Kim | H04W 76/27 |

FOREIGN PATENT DOCUMENTS

| | | |
|---|---|---|
| CN | 102362512 A | 2/2012 |
| CN | 104604269 A | 5/2015 |
| CN | 105451325 A | 3/2016 |
| WO | 2010/070385 A1 | 6/2010 |
| WO | 2014/048493 A1 | 4/2014 |
| WO | 2015/060608 A1 | 4/2015 |
| WO | 2016/013744 A1 | 1/2016 |

OTHER PUBLICATIONS

3rd Generation Partnership Project(3GPP), S2-165105, "Definition of the Term "Mobility Level"", Revision of S2-164708, SA WG2 Meeting #116-BIS, CATT, Sanya, CN, Aug. 29-Sep. 2, 2016, pp. 1-5.

3rd Generation Partnership Project(3GPP), TR 23.799 V0.8.0, "Technical Specification Group Services and System Aspects, Study on Architecture for Next Generation System (Release 14)", Sep. 2016, 423 pages.

3rd Generation Partnership Project(3GPP), TS 23.501 V0.4.0, "Technical Specification Group Services and System Aspects, System Architecture for the 5G System, Stage 2 (Release 15)", Apr. 2017, 124 pages.

3rd Generation Partnership Project(3GPP), TS 23.502 V0.3.0, "Technical Specification Group Services and System Aspects, Procedures for the 5G System, Stage 2 (Release 15)", Mar. 2017, 115 pages.

3rd Generation Partnership Project(3GPP), TS 36.304 V13.2.0, "Technical Specification Group Radio Access Network, Evolved Universal Terrestrial Radio Access (E-UTRA), User Equipment (UE) Procedures in Idle Mode (Release 13)", Jun. 2016, 46 pages.

3rd Generation Partnership Project(3GPP), TS 36.305 V2.0.0, "Technical Specification Group Radio Access Network, Evolved Universal Terrestrial Radio Access (E-UTRA), Stage 2 Functional Specification of User Equipment (UE) Positioning in E-UTRAN (Release 9)", Sep. 2009, 55 pages.

3rd Generation Partnership Project(3GPP), TS 36.331 V13.2.0, "Technical Specification Group Radio Access Network, Evolved Universal Terrestrial Radio Access (E-UTRA), Radio Resource Control (RRC), Protocol Specification (Release 13)", Jun. 2016, 623 pages.

\* cited by examiner

METHODS FOR ENFORCING LIMITED MOBILITY IN MOBILE NETWORK

CROSS-REFERENCE

This application is a continuation of United States Non-Provisional Application No. 16/339,048, filed Apr. 3, 2019, now issued as U.S. Pat. No. 10,743,246, which is the National Stage entry under 35 U.S.C. § 371 of Patent Cooperation Treaty Application PCT/US2017/055511, filed Oct. 6, 2017, which claims the benefit of U.S. Provisional Application No. 62/405,451, filed on Oct. 7, 2016; U.S. Provisional Application No. 62/418,360, filed Nov. 7, 2016; and U.S. Provisional Application No. 62/501,808, filed May 5, 2017. The contents of which are hereby incorporated by reference in their entirety.

BACKGROUND

A wireless transmit/receive unit (WTRU) may be configured to operate in a 5G network. Depending on WTRU capabilities and the deployment scenario, the WTRU may or may not move between various cells of the 5G network. Mobility rules and procedures for 5G networks may be used to support WTRUs associated with various levels of mobility while balancing the amount of processing to be performed by the WTRU and the amount of control signaling exchanged with the network.

SUMMARY

One or more examples as described more fully below provide apparatuses, functions, procedures, processes, execution of computer program instruction tangibly embodying a computer readable memory, functions and operation of methods for one or more of the following. Systems, methods, and instrumentalities are disclosed for enforcing limited mobility in a mobile network. A WTRU may receive a list that indicates one or more mappings between physical cell IDs (PCIs) of one or more neighbor cells and an area identification (AID) for the one or more neighbor cells. The WTRU may determine whether a target cell is in an allowed area or a restricted area using the list. For example, after receiving the mappings of PCIs to AIDs, the WTRU may identify the PCI of a neighbor cell, for example, by receiving the primary synchronization signal (PSS) and secondary synchronization signal (SSS) of the neighbor cell. The WTRU may determine whether the WTRU is a lowed to camp on and/or connect to the neighbor cell by determining the AID for the neighbor cell using the detected PCI for the neighbor cell and the PCI to AID mapping information.

A WTRU may generate a local list of unallowed cells, for example, so that the WTRU can avoid selecting (e.g., repeatedly selecting) an unallowed cell. A WTRU may determine a maximum number of cell selection attempts, for example, to limit cell selection attempts. A WTRU may initiate a timer to control the restart of cell selection attempts.

During operation, a mobility restriction area may become mismatched between a WTRU and the network. The WTRU may attempt to establish a user plane when in a non-allowed area (e.g., a restricted area). The WTRU may update a list of non-allowed areas. For example, the WTRU may update the list of non-allowed areas in response to receiving a service reject message from the network. A WTRU may move to a restricted area. For example, a WTRU in an inactive state may move to a restricted area. The WTRU may indicate to the network that the WTRU has moved to the restricted area. The network may indicate a state change for the WTRU. The WTRU may add a registration area (e.g., a current registration area) in response to receiving a service reject message from the network. The WTRU may add the registration area in the list of non-allowed areas and/or forbidden areas.

A WTRU may determine a PCI for a neighboring cell. The WTRU may receive a PCI to AID mapping list from the network. The WTRU may determine that the neighboring cell is in a restricted area using the PCI to AID mapping list. For example, the WTRU may identify the AID associated with the PCI of the neighboring cell using the PCI to AID mapping list. The WTRU may determine whether the identified AID is associated with the restricted area. The WTRU may exclude the neighboring cell from a cell selection candidate set, for example, based on the determination that the neighboring cell is in the restricted area. The WTRU may not consider the neighboring cell as a handover target, for example, based on the determination that the neighboring cell is in the restricted area. The WTRU may generate a local restricted area list that includes one or more cells in the restricted area.

Systems, methods, aid instrumentalities are disclosed for enforcing limited mobility in a motile network. For example, a wireless transmit/receive unit (WTRU) may receive (e.g., receive from a network) a mapping of physical cell identifications (PCIs) to area identifications (AIDs). The WTRU may determine a first PCI associated with a first neighbor cell. The WTRU may determine, based on the first PCI and the PCIs to AIDs mapping, whether the WTRU is allowed to access the first neighbor cell. The WTRU may perform cell selection or reselection with the first neighbor cell as a cell selection or reselection candidate. The WTRU may perform cell selection or reselection based on the WTRU determining that the WTRU is allowed to access the first neighbor cell. The WTRU may determine that the WTRU is allowed to access the first neighbor cell based on the first PCI and the PCIs to AIDs mapping.

The WTRU may determine a second PCI associated with a second neighbor cell. The WTRU may determine, based on the second PCI and the PCIs to AIDs mapping, whether the WTRU is allowed to access the second neighbor cell. The WTRU may exclude the second neighbor cell from being the cell selection or reselection candidate based on determining that the WTRU is not allowed to access the second neighbor cell based on the second PCI and the PCIs to AIDs mapping.

The WTRU may save an indication that the first and/or second neighbor cell is excluded from being the cell selection or reselection candidate. The first and/or second neighbor cell may be excluded from being the cell selection or reselection candidate based on determining that the WTRU is not allowed to access the first neighbor cell based on the first PCI and the PCIs to AIDs mapping. The indication may be saved local to the WTRU.

DETAILED DESCRIPTION

A detailed description of illustrative examples will now be described with reference to the various Figures. Although this description provides a detailed example of possible implementations, it should be noted that the details are intended to be exemplary and in no way limit the scope of the application.

Figure 1A:
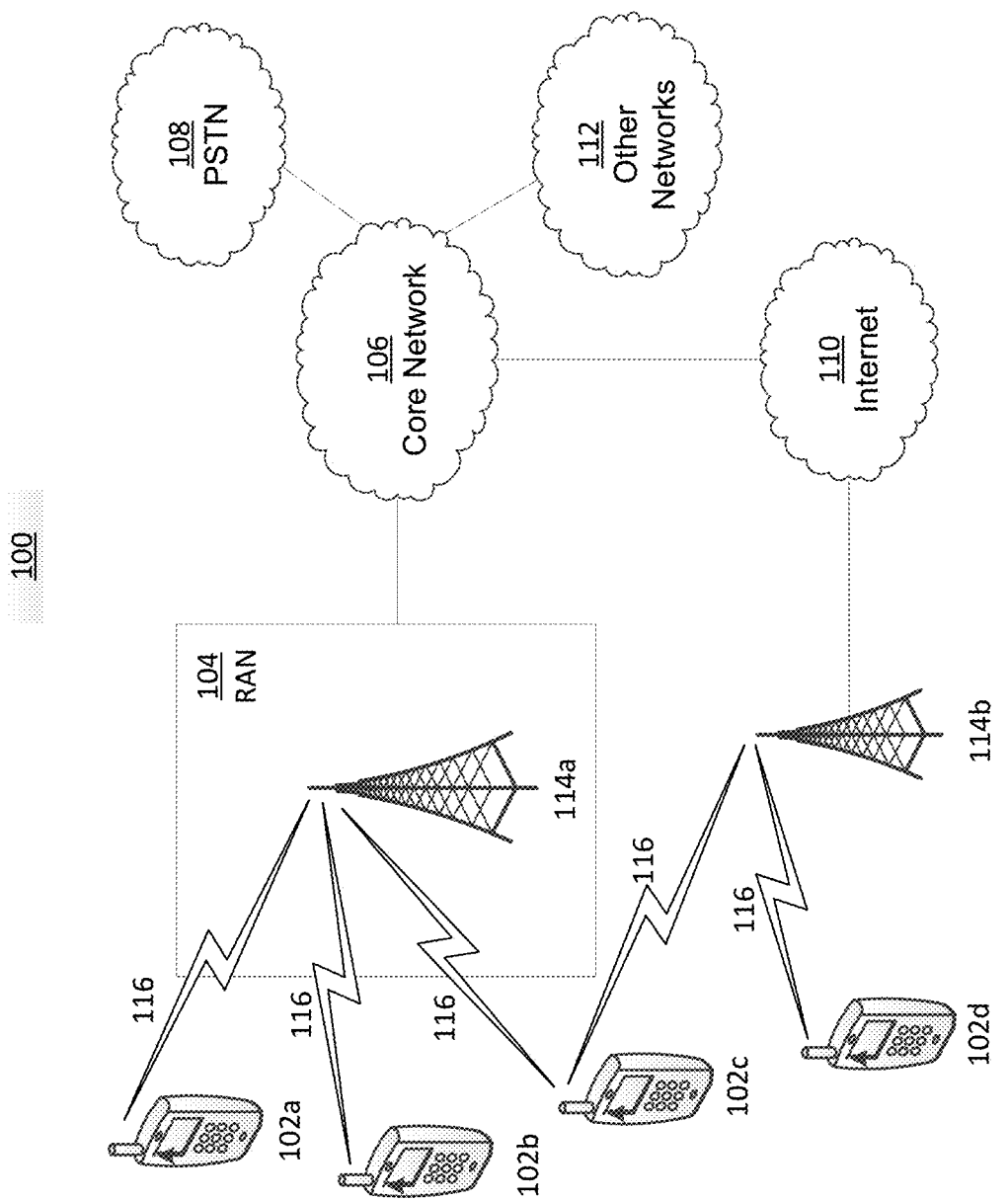
FIG. 1A is a system diagram illustrating an example communications system in which one or more disclosed examples may be implemented.

FIG. 1A is a diagram illustrating an example communications system 100 in which one or more disclosed examples may be implemented. The communications system 100 may be a multiple access system that provides content such as voice, data, video, messaging, broadcast, etc., to multiple wireless users. The communications system 100 may enable multiple wireless users to access such content through the sharing of system resources, inducting wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed examples may contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element it will be appreciated that the base stations 114a, 114b may include any number of interconnected base stations and/or network elements.

The base station 114a may be pert of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one example, the base station 114a may include three transceivers, i.e., one for each sector of the cell. In an example, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b. 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and toe WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Racket Access (HSPA) and/or Evolved HSPA (HSPA+). HSPA may include High-Speed Downlink (DL) Packet Access (HSDPA) and/or High-Speed UL Packet Access (HSUPA).

In an example, the base station 114a and the WTRUs 102a, 102b, 102c may implement a radio technology such as Evolved UMTS Terrestrial Radio Access (E-UTRA), which may establish the air interlace 116 using Long Term Evolution (LIE) and/or LTE-Advanced (LTE-A) and/or LTE-Advanced Pro (LTE-A Pro).

In an example, the base station 114a and the WTRUs 102a, 102), 102c may implement a radio technology such as NR Radio Access, which may establish the air interface 116 using New Radio (NR).

In an example, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In an example, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)). CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by (tones), a roadway, and the like. In an example, the base station 114b and the WTRUs 102c, 102d may implement a radio technology such as IEEE 802.11 to establish a wireless local area network (WLAN). In an example, the base station 114b and the WTRUs 102c, 102d may implement a radio technology such as IEEE 802.15 to establish a wireless personal area network (WPAN). In yet an example, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide cal control, failing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or al of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
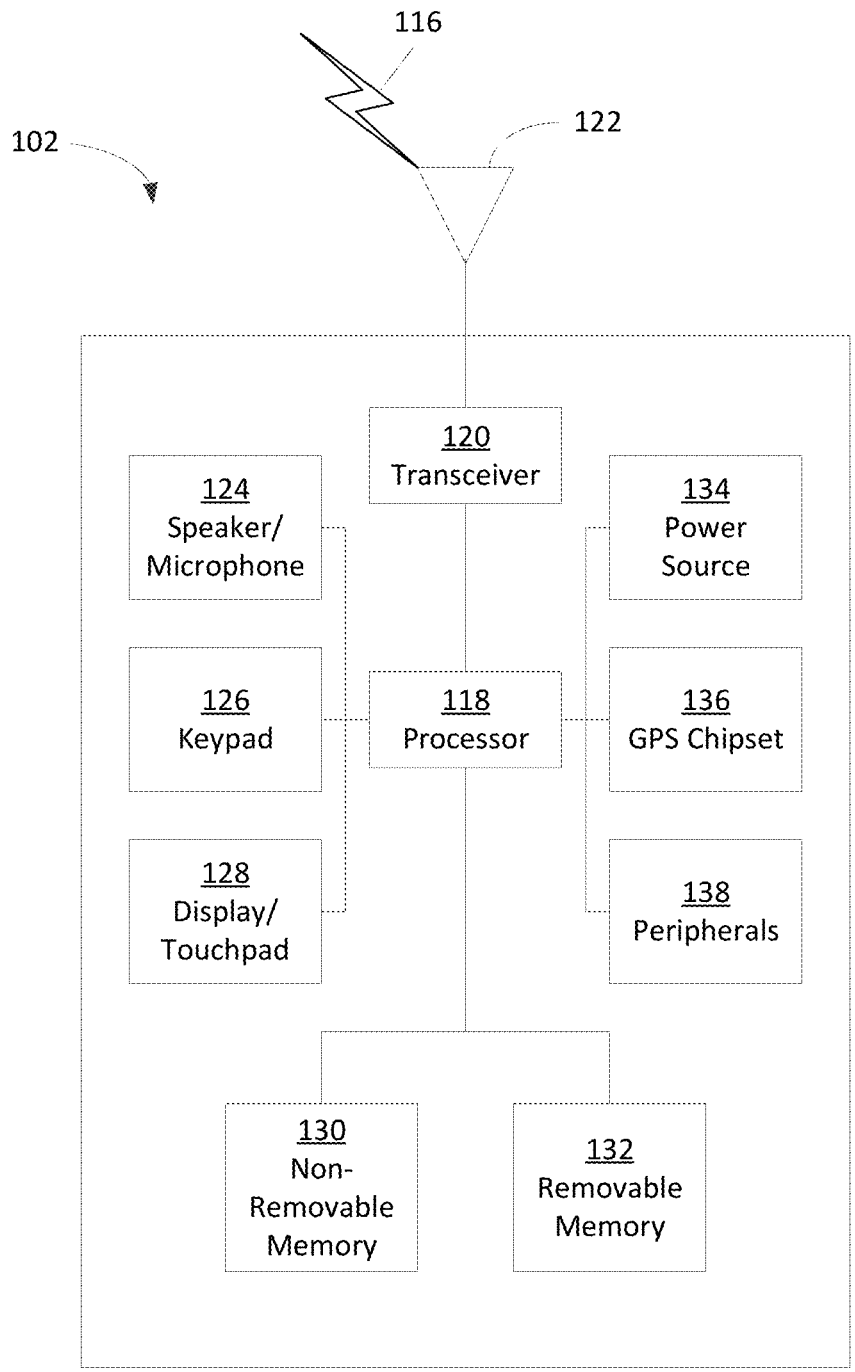
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the lie. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. White FIG. 1B depicts the processor 118 and the transceiver 120 as separate components, it will be appreciated that the processor 118 and the transceiver 120 may be integrated together in am electronic package a chip.

The transmit/receive element 122 may be configured to transmit signals to, or receive signals from, a base station (e.g., the base station 114a) over the air interface 116. For example, in an example, the transmit/receive element 122 may be an antenna configured to transmit and/or receive RF signals. In an example, the transmit/receive element 122 may be an emitter/detector configured to transmit and/or receive IR, UV, or visible fight signals, for example. In an example, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as toe non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and toe like. In examples, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., racket-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of a suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an example, the WRTU 102 may include a half-duplex radio for which transmission and reception of some or al of the signals (e.g., associated with particular subframes for either the UL (e.g., for transmission) or the downlink (e.g., for reception)).

Figure 1C:
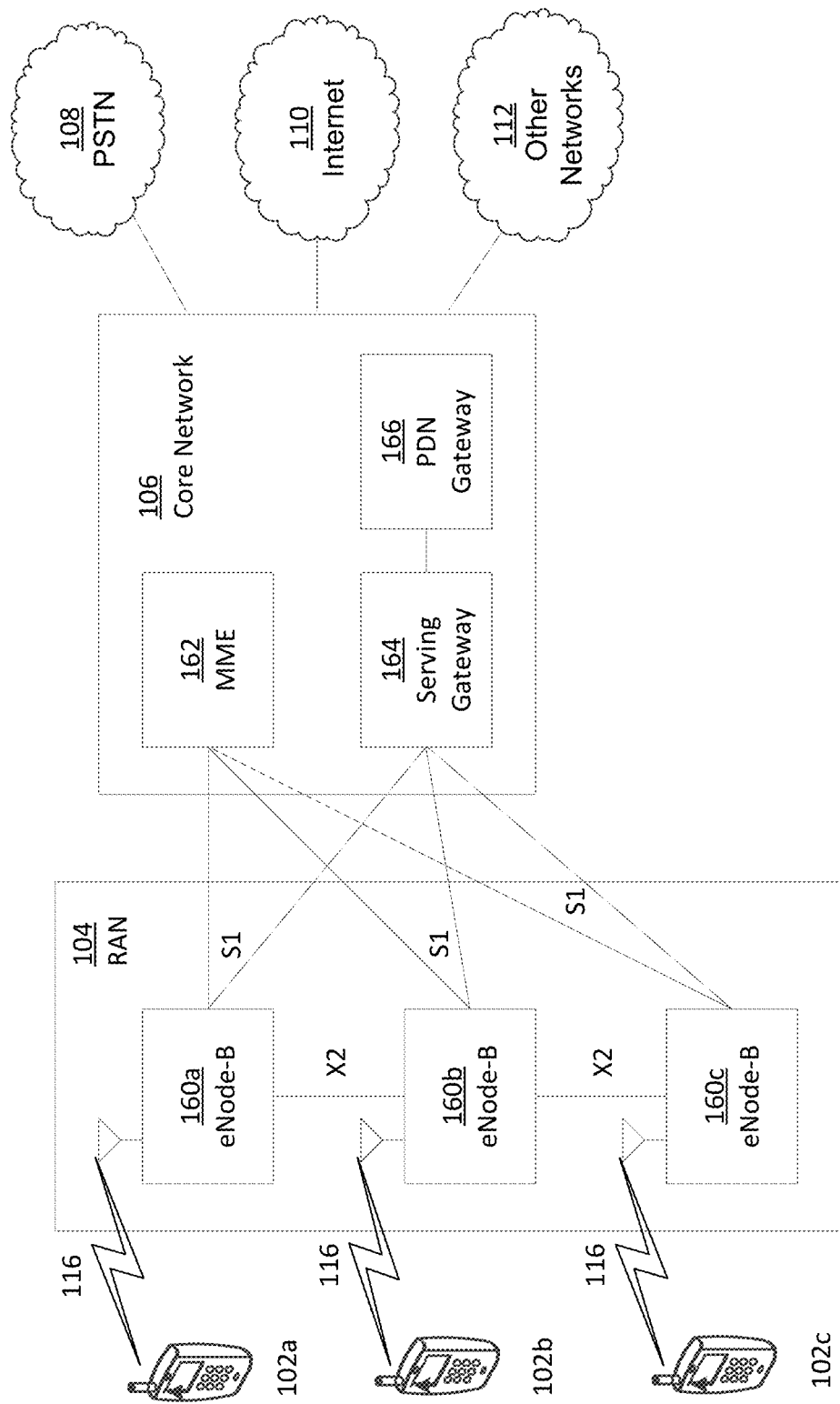
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an example. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an example. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a. 162b, 162c in the RAN 104 via an S1 interface and may serve as a control node. For example, the MME 162 may be responsible for authenticating users of the WTRUs 102a, 102b, 102c, bearer activation/deactivation, selecting a serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when downlink (DL) data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in examples such a terminal may use (e.g., temporarily or permanently) wired communication interfaces with the communication network.

In examples, the other network 112 may be a WLAN.

A WLAN in Infrastructure Basic Service Set (BSS) mode may have an Access Point (AR) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a (tired ink setup (DLS). In examples, the DLS may use an 802.11e DCS or an 802.11z tunneled DLS (TDLS). A WLAN using an Independent BSS (IBSS) mode may not have an AP, and the STAs (e.g., al of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In examples, Carrier Sense Multiple Access with Collision Avoidance (CSMA/CA) may be implemented, for example in in 802.11 systems. For CSMA/CA, the STAs (e.g., every STA), including the AP, may sense toe primary channel. If the primary charnel is sensed/detected and/or determined to be busy by a STA, the STA may back off. One STA (e.g., only one station) may transmit at any given time to a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. In an example, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
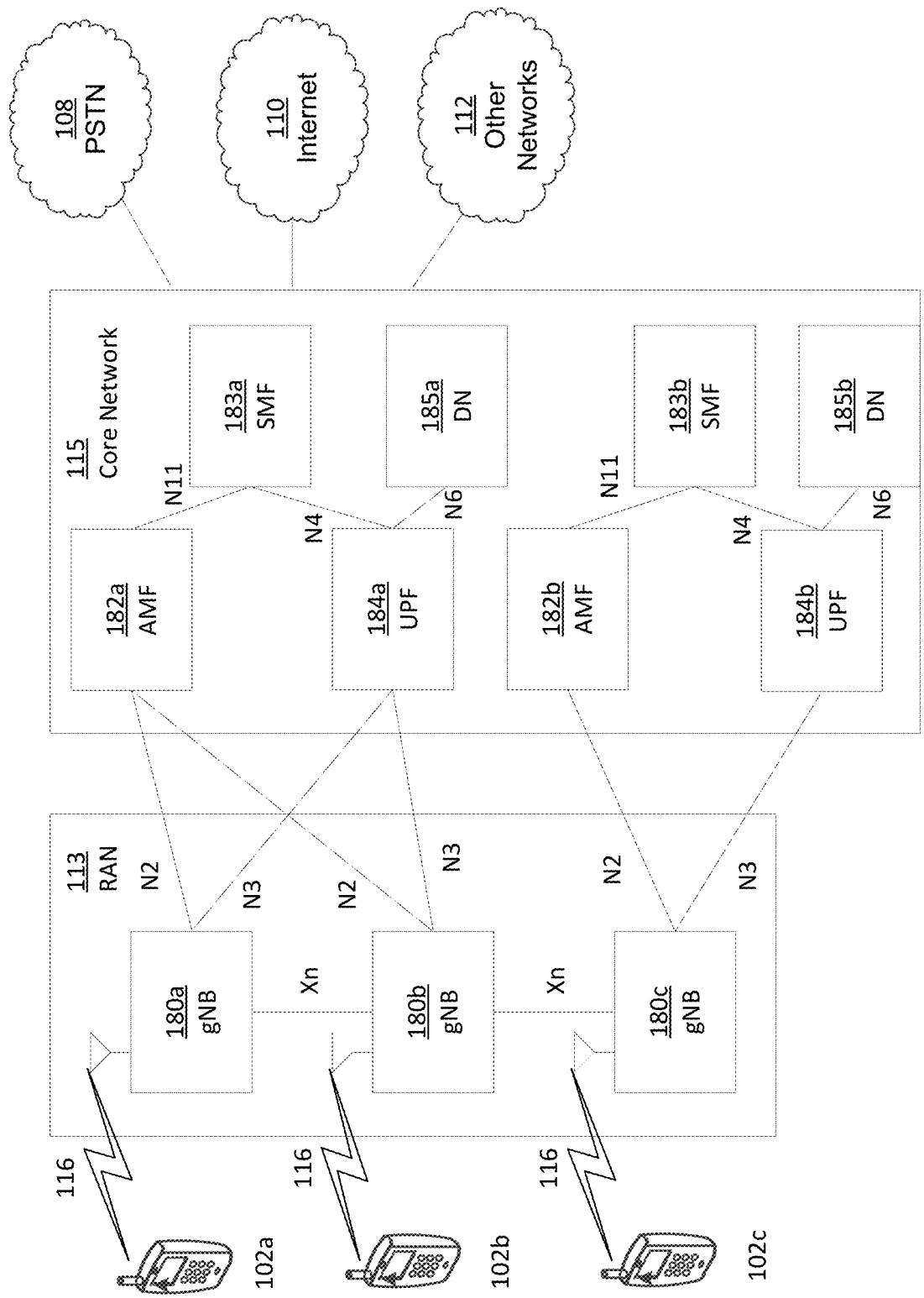
FIG. 1D is a system diagram illustrating a further example RAN and a further example CN that may be used within the communications system illustrated in FIG. 1A.

FIG. 1D is a system diagram illustrating an example RAN 113 and CN 115. As noted above, the RAN 113 may employ an NR ratio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs. The gNBs 180a, 180b, 180c may each include one or more transceivers for communicating with the WTRUs 102a, 102b, 102c over the air interface 116. In an example, the gNBs 180a, 180b. 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an example, the gNBs 180a, 180b, 180c may implement earner aggregation technology. For example, the gNB 180a may transmit multiple component carriers to the WTRU 102a (not shown). A subset of these component carriers may be on unlicensed spectrum while the remaining component carriers may be on licensed spectrum. In an example, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. White each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b to customize CN support for WTRUs 102a, 102b, 102c based on the types of services being utilized WTRUs 102a, 102b, 102a For example, different network slices may be established for different use cases such as services relying on ultra-reliable tow latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A. LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an example, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one a more devices configured to emulate one or more, oral, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or al, functions white being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario to a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A 5G network may enable customizable mobility support. For example, a 5G network may enable customizable mobility support based on a WTRU's mobility capacities, characteristics, applications, and/or services. A 5G network may enable one or more (e.g., different) levels of mobility support. In this manner, the network may configure WTRUs to implement different and/or customized mobility procedures depending on the mobility level assigned to the WTRU and/or the corresponding mobility restrictions associated with different cells.

The levels of mobility support may include a no mobility level. In the no mobility level, the WTRU may be configured to remain static or quasi-static. In the no mobility level, the WTRU may (e.g., may only) access the network via a fixed access point. If the WTRU accesses (e.g., only accesses) the network via a fixed access point, the tracking area (TA) of the WTRU may not change.

The levels of mobility support may include a low mobility level. In the low mobility level, the WTRU may be configured to move (e.g., may be expected to move) within a predefined geographical area and/or an expected geographical area. For example, in the low mobility level, the WTRU may move (e.g., may be expected to move) within a list of TAs for a campus.

The levels of mobility support may include a full mobility level. In the full mobility level, the WTRU may be configured to be allowed to move across one or more geographic areas. For example, in the full mobility level, the WTRU may randomly move across one or more geographic areas and/or may not be generally restricted from moving into other geographical areas.

In the low mobility level, movement of the WTRU may be restricted. For example, hi the low mobility level, movement of the WTRU may be restricted to be within a predefined geographical area. The low mobility level may be referred to as a limited mobility level and/or a restricted mobility level.

A WTRU mobility level may be determined by the core network. For example, a WTRU mobility level may be determined by the core network based on information, such as WTRU subscriptions, WTRU capabilities, WTRU location, and/or network policies. A WTRU mobility level may be changed. For example, a WTRU mobility level may be changed based on one or more of a subscription change, a location change, and/or a policy change.

The core network may configure one or more areas to be associated with a mobility restriction for a WTRU. For example, the core network may configure one or more cells to be considered one or more of an allowed area, a non-allowed area, and/or a forbidden area for a WTRU.

In an allowed area, the WTRU may be permitted to initiate communication with the network. In an a lowed area, the WTRU may be permitted to initiate communication with the network using the control plane (CP) and/or the user plane (UP). The WTRU may be permitted to initiate communication with the network, as allowed by the subscription.

In a forbidden area, the WTRU may not be permitted to initiate communication (e.g., any communication) with the network. For example, in a forbidden area, the WTRU may not be permitted to initiate communication with the network using the CP or the UP.

In a non-allowed area, the WTRU may not be allowed to initiate session management (SM) signalling, but may be allowed to initiate other types of signaling. For example, in a non-allowed area, the WTRU may not be permitted to initiate session management (SM) signaling to obtain user services, but in a non-allowed area, the WTRU may be allowed to initiate mobility management signalling. For example, in a non-allowed area, the WTRU may initiate mobility management signaling so that the network may update (e.g., be able to update) the allowed area list, the forbidden area list, etc. The WTRU may initiate mobility management signalling so that the network may track (e.g., be able to track) stolen equipment etc.

A type of area restriction may take precedence over another type of area restriction. For example, the forbidden area may take precedence over the allowed area and/or the non-allowed area.

In addition to the terms allowed area, non-allowed area, and forbidden area, the term restricted area may be used to represent a non-allowed area and/or a forbidden area. For example, the term restricted area may refer to both a non-allowed area and a forbidden area when not differentiating between the non-allowed area and the forbidden area.

The configuration of an allowed area and/or a restricted area may include a list of area identifications. For example, the configuration of an allowed area and/or a restricted area may include a list of area identifications (AIDs). Example of AIDs may include Tracking Area identifications (TAIs), Global Cell Identifications (GCIs), and/or the like. The AIDs (e.g., each of the AIDs) may be associated with a given mobility restriction (e.g., allowed, non-allowed, forbidden, etc.).

The network may enforce a limited mobility or a restricted mobility of a WTRU. For example, the network may enforce a limited mobility or a restricted mobility of a WTRU when the WTRU is configured with an slowed area or a restricted area.

A WTRU may be configured with one or more allowed and/or restricted areas. The WTRU may be aware of where the WTRU may obtain service or where the WTRU may not obtain service. For example, the WTRU may be aware of where the WTRU may obtain service or where the WTRU may not obtain service, based on one or more of the configured allowed and/or restricted areas. The WTRU may determine whether the WTRU is in an allowed area or in a restricted area. For example, the WTRU may determine whether the WTRU is in an allowed area or in a restricted area, based on one or more area identifications (e.g., current area identifications). The one or more area identifications (e.g., current area identifications) may be broadcasted. For example, the one or more area identifications (e.g., current area identifications) may be broadcasted in the System Information (SI) from the network. The WTRU may match the one or more area identifications (e.g., current area identifications) against one or more configured allowed and/or restricted areas. For example, the WTRU may match the one or more area identifications (e.g., current area identifications) against one or more configured allowed and/or restricted areas of the WTRU. If the WTRU determines that the WTRU is in a restricted area, the WTRU may refrain from initiating a service request.

Figure 2:
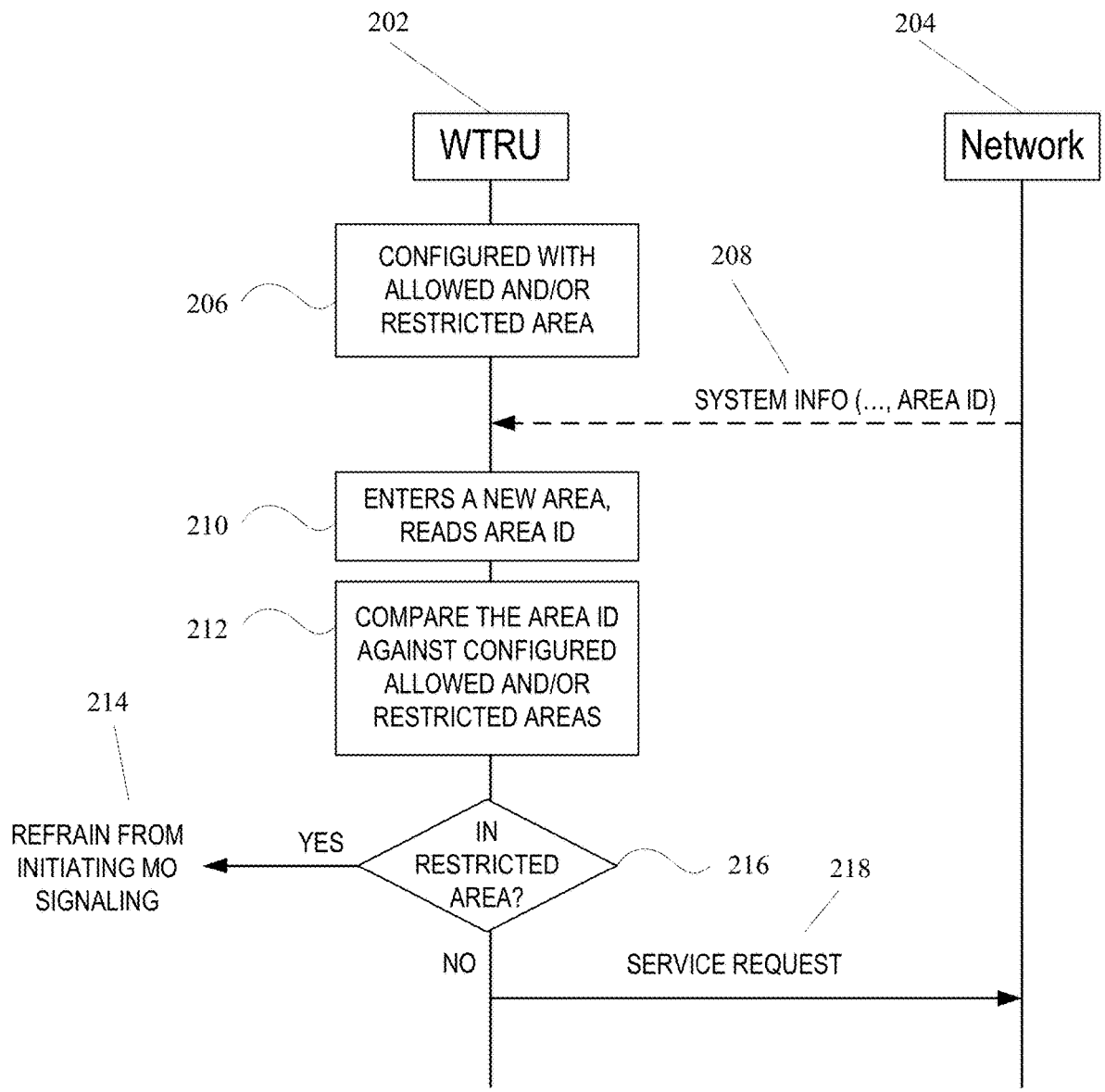
FIG. 2 is a messaging chart depicting an example restricted mobility enforcement.

FIG. 2 depicts an example restricted mobility enforcement.

As shown in 206, the WTRU 202 may be configured with one or more allowed and/or restricted areas. The WTRU 202 may be configured with one or more allowed and/or restricted areas via pre-configuration, Open Mobile Alliance (OMA) Device Management procedures, and/or Mobility Management signalling procedures.

When WTRU 202 is configured with the allowed and/or restricted areas, the WTRU 202 may determine whether WTRU 202 is in a restricted area fester than another entity. For example, when WTRU 202 is configured with the allowed and/or restricted areas, the WTRU 202 may determine whether WTRU 202 is in a restricted area fester than the network 204. When WTRU 202 is configured with the allowed and/or restricted areas, the WTRU 202 may determine whether WTRU 202 is in a restricted area without a signalling exchange with the Network 204. When the WTRU 202 is configured with the allowed and/or restricted areas, the WTRU 202 may refrain from initiating MO requests (e.g., unnecessary MO requests). For example, the WTRU 202 may not initiate an unnecessary MO request, which may fail.

The WTRU 202 may attempt to camp on allowed areas. For example, the WTRU 202 may attempt to camp on allowed areas when the WTRU 202 is assigned a mobility level of low mobility a limited mobility. The WTRU 202 may attempt to camp on allowed areas as much as possible. The WTRU 202 may avoid selecting a reselecting cells that belong to restricted areas.

The WTRU 202 may determine whether the WTRU is in an allowed a restricted area after reading System Information. For example, when WTRU 202 is configured with the allowed and/or restricted areas, the WTRU 202 may determine whether WTRU 202 is in an allowed a restricted area after reading System Information. WTRU 202 may read system information after the WTRU 202 has selected a cell and has camped on the cell. If the WTRU 202 is in a restricted area, the WTRU 202 may stay in a cell in the restricted area (e.g., the wrong cell) without service a the WTRU 202 may reselect to another cell (e.g., a correct cell). Reading System Information of a wrong cell may waste time and/or resources. The WTRU 202 may determine whether a target cell is in an allowed a restricted area before camping on the target cell.

A network, such as network 204, may enforce limited mobility or restricted mobility on the WTRU 202. The network 204 may enforce limited mobility a restricted mobility on the WTRU 202 when the WTRU 202 is configured with one or more allowed a restricted areas. The network 204 may enforce limited mobility or restricted mobility on the WTRU 202 when the WTRU 202 is not configured with one a more allowed a restricted areas.

The one or more allowed a restricted areas may be configured on the network side. For example, the one a more allowed a restricted areas may be configured on the network side and not configured in the WTRU. The one a more allowed a restricted areas may be configured in WTRU subscription data and/a in WTRU mobility context. As shown in 208, the Network 204 may provide system information to the WTRU 202. The system information may include WTRU information. For example, the system information may include WTRU subscription data. The system information may include network information. The system information may include Area ID information.

WTRU 202 may enter a new area, as shown in 210. When WTRU 202 enters a new area, WTRU 202 may not know whether WTRU 202 is in an allowed area or a restricted area. For example, WTRU 202 may not know whether WTRU 202 is in an allowed area or a restricted area until WTRU 202 initiates mobile originating (MO) signaling. MO signalling may include an Area Update, an Area ID, and/or a Service Request. As shown in 212, the WTRU 202 may determine whether the WTRU 202 is in an allowed area or a restricted area. For example, as shown in 212, the WTRU 202 may determine whether the WTRU 202 is in an allowed area or a restricted area by comparing the Area ID against allowed and/or restricted areas, as shown in 216. The WTRU 202 may compare the Area ID against configured allowed and/or restricted areas.

If WTRU 202 is in an allowed area, MO signaling may be successful. For example, if the WTRU 202 is in an allowed area, a service request may be sent from WTRU 202 to Network 204, as shown in 218. If the WTRU 202 is in a restricted area, the MO signaling may be rejected by Network 204. For example, if the WTRU 202 is in a restricted area, the MO signalling may be rejected by Network 204 with an indication that WTRU 204 is in a restricted area. If WTRU 202 is in a restricted area, WTRU 202 may refrain from initiating MO signaling, as shown in 214.

The WTRU may not be configured with the allowed and/or restricted areas (e.g., allowed and/or restricted area information). When a WTRU is not configured with the allowed and/or restricted areas, the WTRU may be unable to determine whether the WTRU is in an allowed or restricted area. For example, the WTRU may be unable to determine whether the WTRU is in an allowed or restricted area before the WTRU's MO request is rejected by the network.

A WTRU may avoid camping on a restricted cell. For example, a WTRU may avoid camping on a restricted cell before the WTRU reads System Information and/or sends a MO request. The WTRU may avoid camping on a restricted cell before reading System Information and/or send fog a MO request to reduce delay. For example, the WTRU may avoid camping on a restricted cell before reading System Information and/or sending a MO request to reduce the delay of cell selection/reselection and/or to enable efficient power consumption. A restricted cell may be a cell in a restricted area.

The WTRU may camp on a restricted cell and/or may attempt to reselect to another cell. If the WTRU camps on a restricted cell and/or attempts to reselect to another cell, a next target cell may be in an allowed area or the next target cell may not be in an allowed area. The WTRU may reselect (e.g., continue reselecting, such as circling around) one or more cells in restricted areas. For example, WTRU may continue reselecting one or more wrong cells.

The WTRU may be configured to avoid selecting (e.g., repeatedly selecting) wrong cells.

The serving RAN and/or WTRU may select a target cell for handover. For example, during handover, the serving RAN and/or WTRU may select a best target cell) for handover. The serving RAN may control the target cell selection. The configuration of restricted areas may be unavailable in the RAN. The serving RAN may (e.g., may incorrectly) hand over WTRU to a cell. For example, the serving RAN may (e.g., may incorrectly) hand over WTRU to a cell in a restricted area. In WTRU controlled handover, WTRU may be unable to determine whether the target cell is restricted or is unrestricted. For example, in WTRU controlled handover, WTRU may be unable to determine whether the target cell is restricted or is unrestricted before the WTRU accesses the target cell and/or reading the target cell's System Information (SI).

During operation, a mismatch may occur to the mobility restriction area maintained at the WTRU and/or maintained at the network. For example, knowledge of mobility restriction, non-allowed areas, and/or forbidden areas at the WTRU may be different from the non-allowed areas configured for that WTRU at the network. As an example, a network configuration may be updated by the network without notifying the WTRU. The mobility restriction area, non-allowed area, and/or forbidden area may be mismatched between the WTRU and the network when network reconfigures the mobility restriction area. For example, the mobility restriction area, non-allowed area, and/or forbidden area may be mismatched between the WTRU and the network when network reconfigures the mobility restriction area while the WTRU is in idle mode. The WTRU may not be notified (e.g., may not be immediately notified) of a change in the mobility restriction area. For example, the WTRU may not be notified of a change in the mobility restriction area because the WTRU may be in an unreachable state and/or the network may desire to notify the WTRU of the change in the mobility restriction area when the WTRU transitions to a connected state.

The WTRU may be restricted from initiating signaling. For example, the WTRU may be restricted from initiating signaling to establish a data session. The WTRU may be restricted from initiating signaling to establish a data session when the WTRU is in a non-allowed area (e.g., a restricted area). The WTRU may initiate signaling to establish a data session which may (e.g., should) be prevented. For example, the WTRU may initiate signaling to establish a data session which may (e.g., should) be prevented based on a configuration mismatch of a mobility area restriction. WTRU and/or network actions may be performed to synchronize the mobility restriction area. For example, the WTRU and/or network actions may be performed to synchronize the mobility restriction area between the WTRU and the network in such scenarios.

An RRC INACTIVE state may be provided for a next generation WTRU and/or RAN. For example, an RRC INACTIVE state and/or IDLE and CONNECTED states may be provided for the next generation WTRU and/or RAN. A WTRU in the RRC INACTIVE state may behave like a WTRU in the IDLE state. For example, a WTRU in the RRC INACTIVE state may behave like a WTRU in the IDLE state to minimize the signaling activities and/or power consumption. A WTRU context may be maintained in the RAN and/or the network control plane (CP) and user plane (UP) connections may be kept. For example, when the WTRU is in the RRC INACTIVE state, a WTRU context may be maintained in the RAN and/or the network CP and UP connections may be kept. When a WTRU is in the RRC INACTIVE state, the WTRU's location may not be tracked by the core network (CN). When a WTRU is in the RRC INACTIVE state, the WTRU's location may be tracked by the RAN. For example, the WTRU's location may be tracked by the RAN at cell level or at "RAN notification/paging area" level. A WTRU in RRC INACTIVE state may transition to CONNECTED state. For example, a WTRU in RRC INACTIVE state may transition to CONNECTED state without a foil RRC establishment. The WTRU may begin transmitting data without performing a state transition.

A WTRU may be assigned a mobility level of Restricted Mobility. For example, a WTRU may be assigned a mobility level of Restricted Mobility for an IDLE state. When the WTRU transitions to CONNECTED state and (e.g., and then) to INACTIVE state, the mobility level may remain a Restricted Mobility. For example, a Restricted Mobility level assigned in idle mode may apply for the RRC INACTIVE state. For example, the WTRU's mobility behavior in the RRC INACTIVE state may follow (e.g., mostly follow) that in IDLE state. The CN may determine a WTRU that has transitioned from the CONNECTED state to the RRC INACTIVE state to be in the CONNECTED state. The DL data may be forwarded (e.g., continue to be forwarded) to RAN. The RAN may not be able (e.g., allowed) to deliver the DL date to the WTRU when the WTRU is in the restricted area.

A network may provide information relating to one or more restricted cells. The information relating to restricted cells may be identified by PCIs and/or corresponding Area IDs. For example, the network may provide (e.g., to a WTRU) a list of restricted cells which may be identified by PCIs and/or corresponding Area IDs. The WTRU may determine whether a candidate or target cell is in an allowed or restricted area. For example, the WTRU may determine whether a candidate or target cell is in an allowed or restricted area before camping on the candidate or target cell. The WTRU may read the System Information of the candidate or target cell and may avoid cell selection and/or SI reading.

A WTRU may be unable to determine whether a target cell is in an allowed area or a restricted area. For example, the WTRU may be unable to determine whether a target cell is in an slowed area or a restricted area because the area identifications (e.g., such as tracking area identifications (TAIs) or global cell IDs) that are used to configure the allowed or restricted area list in the WTRU may be unrecognizable (e.g., not recognized) before the WTRU camps on the target cell. Area identifications may include a TAI, a global cell ID (GCI), and/or the like. Network may determine whether a target cell is in an allowed area or a restricted area. Network 304 may broadcast the area identifications. For example, network 304 may broadcast the area identifications in the network's System Information (e.g., SIB1 in LTE). The WTRU may be able to read (e.g., may only be able to read) the System Information after the WTRU camps on the target cell.

Figure 3:
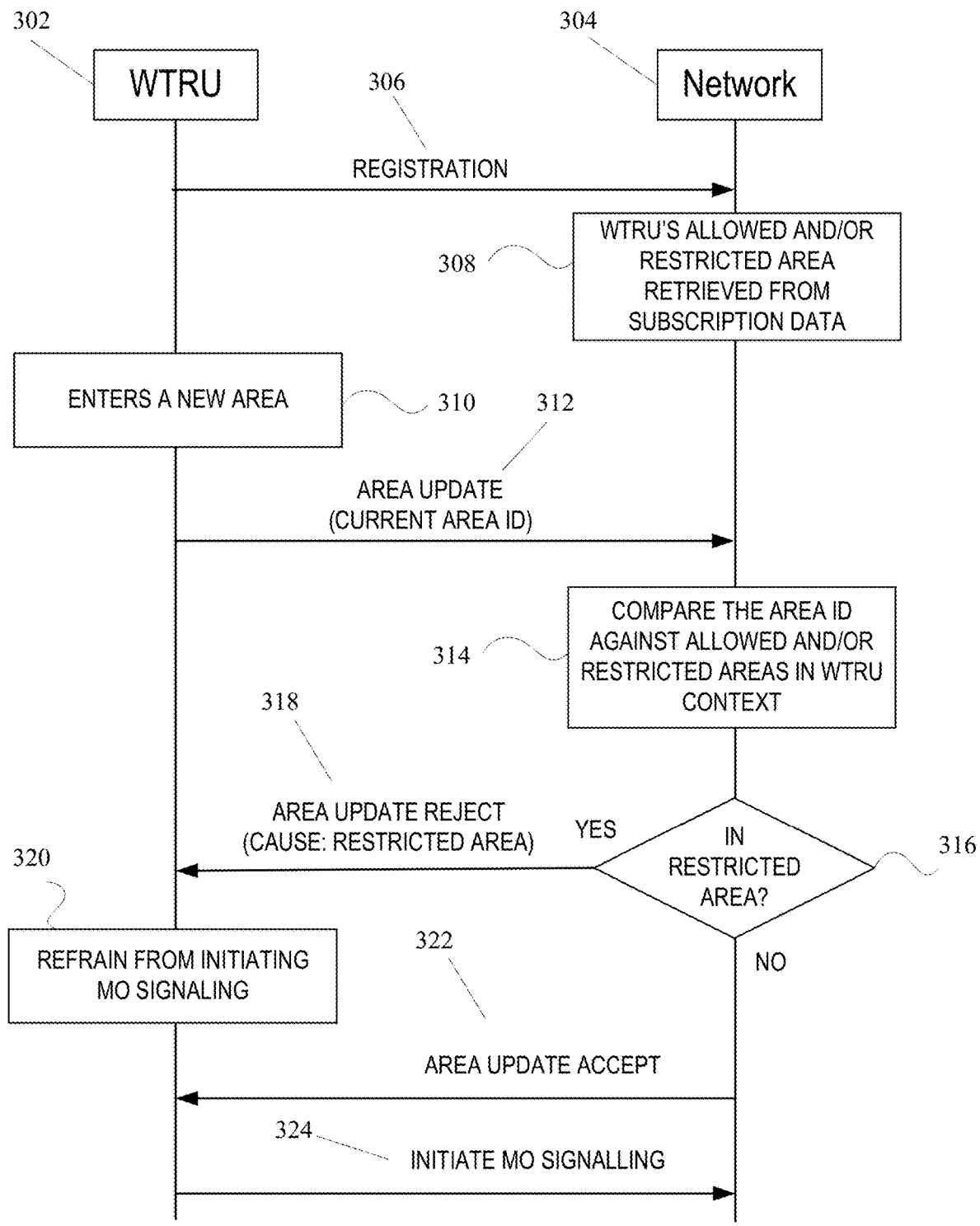
FIG. 3 is a messaging chart depicting an example restricted mobility enforcement.

FIG. 3 depicts an example restricted mobility enforcement with network 304 configured with one or more allowed and/or restricted areas. As shown by 306, WTRU 302 may register with network 304. Network 304 may be configured with the allowed and/or restricted areas, as shown by 308. For example, network 304 may retrieve the allowed and/or restricted areas of WTRU 304 from subscription data.

The WTRU 302 may enter a new area, as shown in 310. For example, WTRU 302 may enter an allowed area or a restricted area. WTRU 302 may not know whether WTRU 302 has entered an allowed area or a restricted area when WTRU 302 enters a new area. For example, WTRU 302 may not know whether WTRU 302 has entered an allowed area or a restricted area until WTRU 302 initiates mobile originating (MO) signaling. MO signaling may include an Area Update, and Area ID, and/or a Service Request.

The WTRU 302 may send Network 304 an area update, as shown in 312. The area update may include an area ID of the WTRU 302. The area ID of the WTRU 202 may be the current area ID. The area ID of the WTRU 202 may be another area ID (e.g., an adjacent area ID).

The Network 304 may determine whether the WTRU 302 is in an allowed area or in a restricted area. For example, as shown in 314, Network 303 may determine whether the WTRU 302 is in an allowed area or in a restricted area by comparing the Area ID (e.g., current area ID) against an a lowed area and/or restricted area. For example, the Network 304 may compare the current Area ID against configured allowed and/or restricted areas.

The Network 304 may prevent the WTRU 302 from connecting to a restricted area. For example, the Network 304 may prevent the WTRU 302 from connecting to the restricted area if the Network 304 determines that the WTRU 302 is in a restricted area. As shown in 318, if the Network 304 determines that the WTRU 302 is to a restricted area, the Network 304 may send WTRU 302 an area update reject message. The area update reject message may include an indication of the rejection. For example, the area update reject message may include an indication that the rejection was caused because the WTRU 302 attempted to enter a restricted area. If the WTRU 302 receives an area update reject message, the WTRU 302 may refrain from initiating MO signaling, as shown in 320.

If Network 304 determines that the WTRU 302 is in a restricted area (e.g., forbidden area) the Network 403 may send an Area Update Rejection message 318, for example, indicating the cause of the rejection was that the WTRU was to a restricted (e.g., forbidden) area. If the Network 304 determines that the WTRU 302 is in an slowed area (e.g., not in a restricted area), the Network 304 may accept the WTRU's area update request. For example, as shown in 322, if the Network 304 determines that the WTRU 302 is in an allowed area, the Network 304 may send WTRU 302 an area update accept message. If the WTRU 302 receives an area update accept, the WTRU 302 may initiate MO signaling or MO data, as shown in 324.

Figure 4:
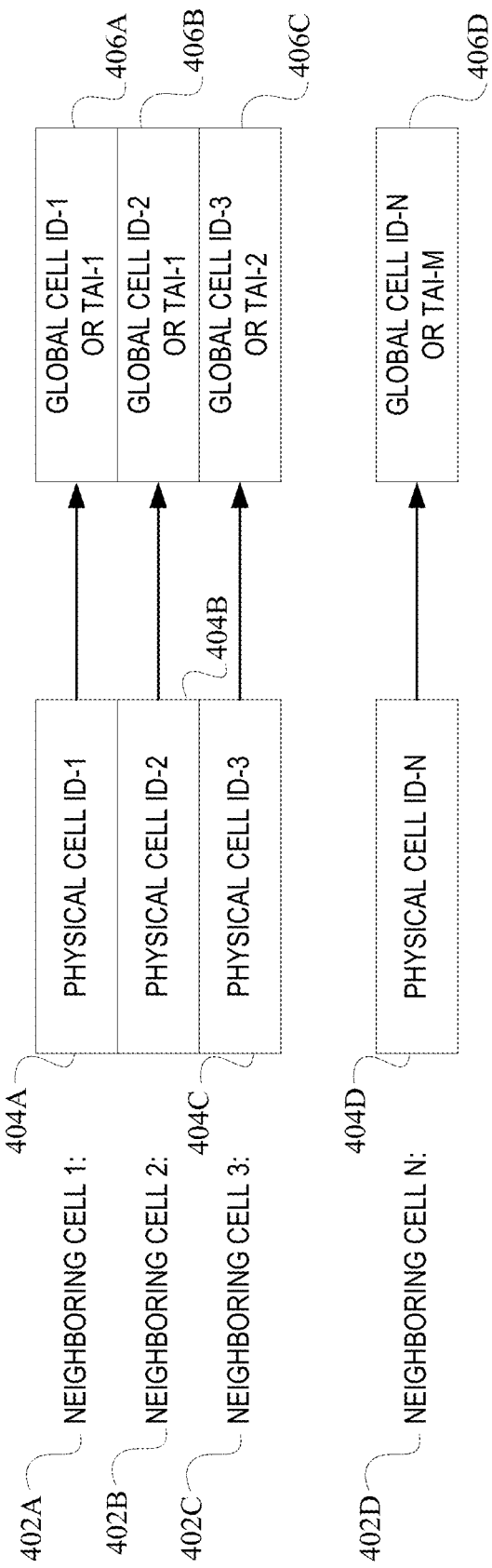
FIG. 4 depicts an example mapping of neighboring cell physical cell identification (ID) to area identification (AID).

As described herein, the WTRU may receive one or more neighboring cell Area Identifications. FIG. 4 depicts an example mapping of physical cell IDs (e.g., PCIs of neighbor cells) to one or more mobility areas such as TAIs or GCIs. FIG. 4 depicts an example mapping of physical cell IDs (e.g., physical cell IDs relating to a neighboring cell) to global cell IDs and/or tracking area IDs (e.g., area IDs). One or more mappings may be provided via a list. The list may include a mapping of the one or more neighboring cell's physical cell ID to its area ID (e.g., such as GCI and/or TAI). For example, neighboring cells 402A, 402B, 402C, 402D (collectively referred to as 402) may be associated with respective physical cell IDs 404A, 4048, 404C, 404D (collectively referred to as 404). Physical cell IDs 404A, 4048, 404C, 404D may be associated with respective global cell-IDs or TAI IDs 406A, 4068, 406C, 406D (collectively referred to as 406). The Area Identification used in the list may depend on what information (e.g., TAI or GCI) is used to configure the allowed or restricted area in the WTRU.

A WTRU may receive the list of mappings of neighboring cell physical cell IDs to area IDs. The list of mappings may be broadcast by a serving RAN. For example, the list of mappings may be broadcast by a serving RAN as part of System Information. A WTRU that supports limited mobility may use (e.g., require) the list of mappings. For example, a WTRU that supports limited mobility may use (e.g., require) the list of mappings when the WTRU accesses the serving RAN. The WTRU may delay reading the system information. For example, the WTRU may delay reading the list of mappings (e.g., the list of mappings included in the system information). The WTRU may delay read tog the list of mappings (e.g., the list of mappings included to the system information) until the WTRU is assigned to a limited mobility level.

The WTRU may receive the list of mappings from the serving RAN. For example, the WTRU may receive the list of mappings from the serving RAN in dedicated RRC messages. The serving RAN may indicate that a list of mappings of neighboring cell physical cell IDs to area IDs is available. For example, the serving RAN may indicate that a list of mappings of neighboring cell physical cell IDs to area IDs is available by including a flag in the broadcast system information. The WTRU may send a RRC request message to the serving RAN for the list of mappings. The WTRU may request (e.g., request via the RRC request message) the mappings between neighboring cells' physical Cell IDs and Area IDs. The returned list of mappings may include mappings for allowed and/or restricted cells.

The WTRU may indicate the WTRU's allowed and/or restricted Area IDs. For example, the WTRU may indicate the WTRU's allowed and/or restricted Area IDs in a RRC request message. The serving RAN may return (e.g., may only return) the physical Cell IDs of the neighboring cells that are allowed and/or restricted.

The WTRU may request an update to the list of mappings. For example, the WTRU may request an update to the list of mappings when a WTRU moves to camp on a new cell. The WTRU may request an update to the list of mappings from the new serving RAN.

The WTRU may receive the list from the core network. For example, the WTRU may receive the list from the Mobility Management Function (e.g., through Mobility Management signaling). The core network may include the topology (e.g., lull topology) of the network. For example, the core network may include the topology (e.g., Ml topology) of the network, such that the core network may generate a list of mappings according to the WTRU's location. The core network may query the serving RAN and/or Operation and Management (OAM) for the list of mappings. For example, the core network may query the serving RAN or OAM for the list of mappings when the core network provides (e.g., needs to provide) the list of mappings to the WTRU.

A limited mobility WTRU (e.g., a limited mobility WTRU in idle or connected inactive mode) may check a candidate cell's physical Cell ID against a list. For example, with the list of mappings between Physical Cell IDs (PCIs) and its Area IDs available, a limited mobility WTRU in idle or connected inactive mode may check a candidate cell's physical Cell ID against the list of mappings. A limited mobility WTRU in idle or connected inactive mode may check a candidate cell's physical Cell ID against the list of mappings before determining to camp on the candidate cell. If the candidate cell's Cell ID is in the list a corresponding Area ID may be available from the list. The WTRU may check the corresponding Area ID against the WTRU's local configuration of allowed or restricted area list. If the candidate cell is in the restricted area, the WTRU may exclude the candidate cell from the candidate cell set for cell selection or reselection ranking evaluation.

A limited mobility level WTRU in connected mode may check the candidate cell's physical Cell ID against the list. For example, a limited mobility level WTRU in connected mode may check the candidate cell's physical Cell ID against the list before selecting a target cell for handover. If a candidate cell is to the restricted area, the WTRU may choose not to include the measurement of the candidate cell in the restricted area to a measurement report, to WTRU autonomous handover control, the WTRU may exclude the candidate cell in the restricted area from being a handover target.

Figure 5:
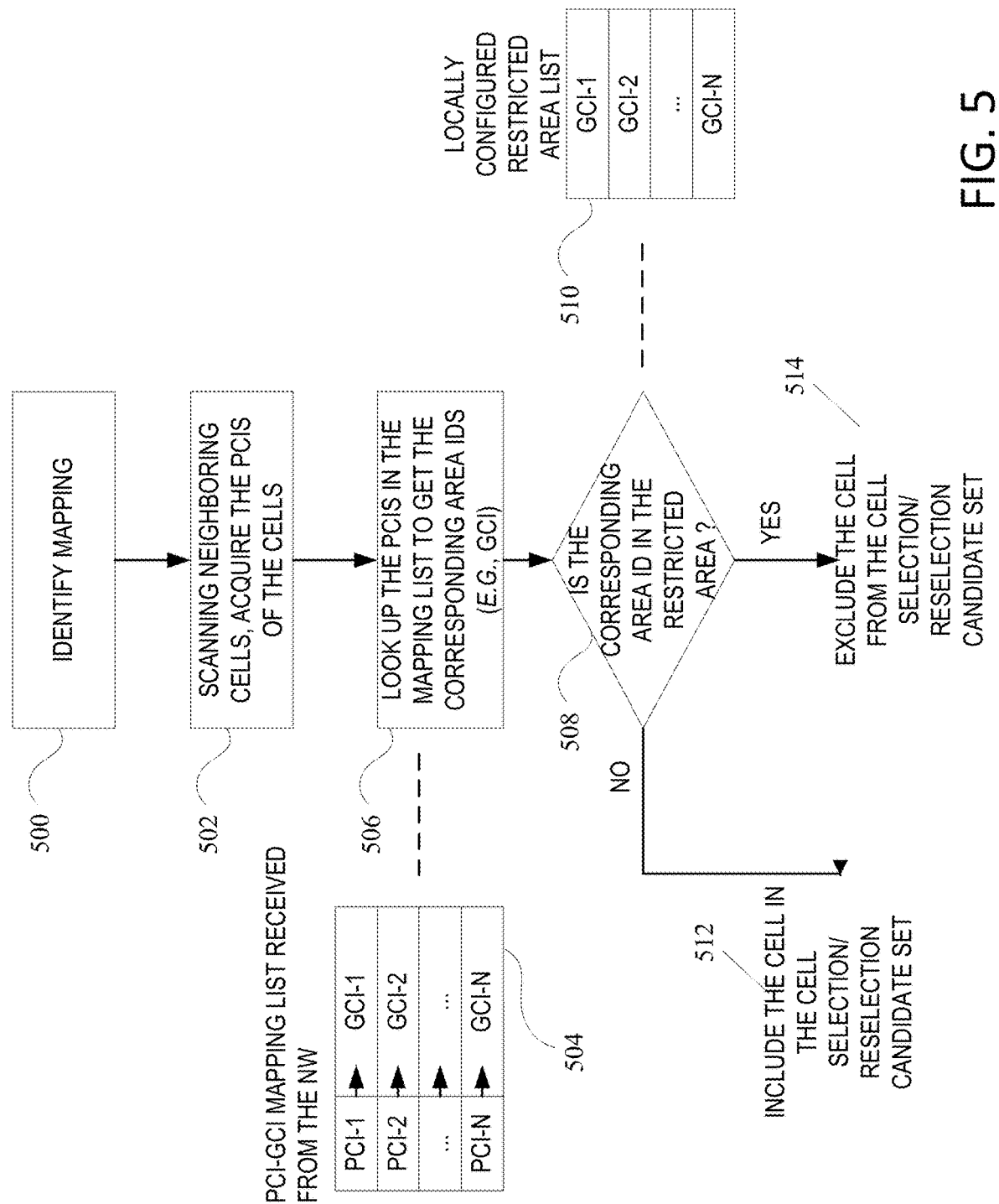
FIG. 5 depicts an example filtering of cells in a restricted area using a physical cell ID to area ID mapping list.

FIG. 5 depicts an example filtering of cells in a restricted area using a mapping. The mapping may be a physical cell ID to area ID mapping. The physical cell ID to area ID mapping may be provided via a list (e.g., a physical cell ID to area ID mapping list). At 500, the WTRU may identify a mapping. For example, the WTRU may receive and/or determine a list or mapping 504 that associates the PCIs with an AID, such as a GCI. The WTRU may receive a list of PCIs associated with neighbour cells in the area and the list may associate each PCI with one of more AIDs. For example, the AIDs may correspond to tracking areas and/or the received list 504 may associate the PCIs of neighbour cells with TAIs. The AIDs may correspond to GCIs and/or the list may associate the PCIs of neighbour cells with the GCIs. The WTRU may have received mobility management signalling and/or may be configured with a list of allowed TAIs, a list of forbidden TAIs, and/or a list of not allowed TAIs (e.g., and/or a list of allowed tracking area codes (TACs), a list of forbidden TACs, and/or a list of not-allowed TACs). The WTRU may have received mobility management signalling and/or may be configured with a list of allowed GCIs, a list of forbidden GCIs, and/or a list of not allowed GCIs.

For example, the neighboring cells may be scanned, at 502. For example, the neighboring cells may be scanned by a WTRU. The neighboring cells may include a physical cell ID (PCI), such as described herein. A list mapping the PCI and global cell ID (GCI) may be provided, at 504. For example, the network may provide a list mapping the PCI and the GCI. The network may provide a list mapping the PCI and the GCI to a WTRU.

An area ID may be determined. For example, the PCI in the mapping list may be used to determine an area ID (e.g., a corresponding area ID), at 506. The area ID may be a global ID (GCI), a TAI, or the like.

It may be determined whether the area ID (e.g., corresponding area ID) corresponds to a restricted area or an allowed area, at 508. For example, at 510, the WTRU may generate a local list of cells that have been determined to be in one or more restricted areas. The WTRU may generate a local restricted cell list based on the mobility level of the WTRU. The WTRU may generate a local restricted cell irrespective of the mobility level that the WTRU is assigned to. For example, the WTRU may generate and/or update the local restricted cell list when the WTRU is assigned to a limited mobility level. The WTRU may generate and/or update the local restricted cell list when the WTRU is assigned to a full mobility level and/or a no mobility level (e.g., as long as the configured allowed or restricted area is available).

The WTRU may add the PCI and/or Area ID of the cell to the local list of restricted cells. For example, the WTRU may add the PCI and/or Area ID of the cell to the local list of restricted cells when the WTRU reads the Area ID information from a cell's System Information. The WTRU may add the PCI and/or Area ID of the cell to the local list of restricted cells when the WTRU reads the Area ID information from a cell's System Information and determines that the cell is in the configured restricted area. At 508, the WTRU may check the PCI and/or Area ID of a candidate or target cell against the local list of restricted cells. For example, the WTRU may check the PCI and/or Area ID of a candidate or target cell against the local list of restricted cells when the WTRU is looking for a candidate or target cell for camping or handover. If the PCI and/or Area ID of the candidate or target cell is found in the local list of restricted cells, the WTRU may exclude the cell from the cell selection/reselection candidate set, at 514. For example, if the PCI and/or Area ID of the candidate or target cell is found in the local list of restricted cells, the WTRU may exclude the cell from being a candidate camping cell and/or a handover target.

The WTRU may include a cell in the cell selection/reselection candidate set. For example, if the PCI and/or Area ID of the candidate or target cell is not found in the local list of restricted cells, the WTRU may include the cell in the cell selection/reselection candidate set, at 512. If the PCI and/or Area ID of the candidate or target cell is not found in the local list of restricted cells, the WTRU may determine that the candidate or target cell is an allowed cell. If the PCI and/or Area ID of the candidate or target cell is not found in the local list of restricted cells, the WTRU may allow the cell to be a candidate camping cell and/or a handover target.

A WTRU may generate a user interface presentation about the restricted area. For example, the WTRU may generate a user interface presentation about the restricted area using the received mapping list. The WTRU may determine whether one or more neighboring cells are in the restricted area (e.g., by checking against this mapping list). If the WTRU determines that one a more neighboring cells are in the restricted area (e.g., by checking against this mapping list), the WTRU may warn a user via a user interface. The WTRU may warn a user via a user interface so that the user may decide not to move further (e.g., to avoid the risk of losing service). The WTRU may generate a map to indicate which cells and/or areas around the user are allowed or restricted. The WTRU may use the mapping list b generate the map.

Figure 6:
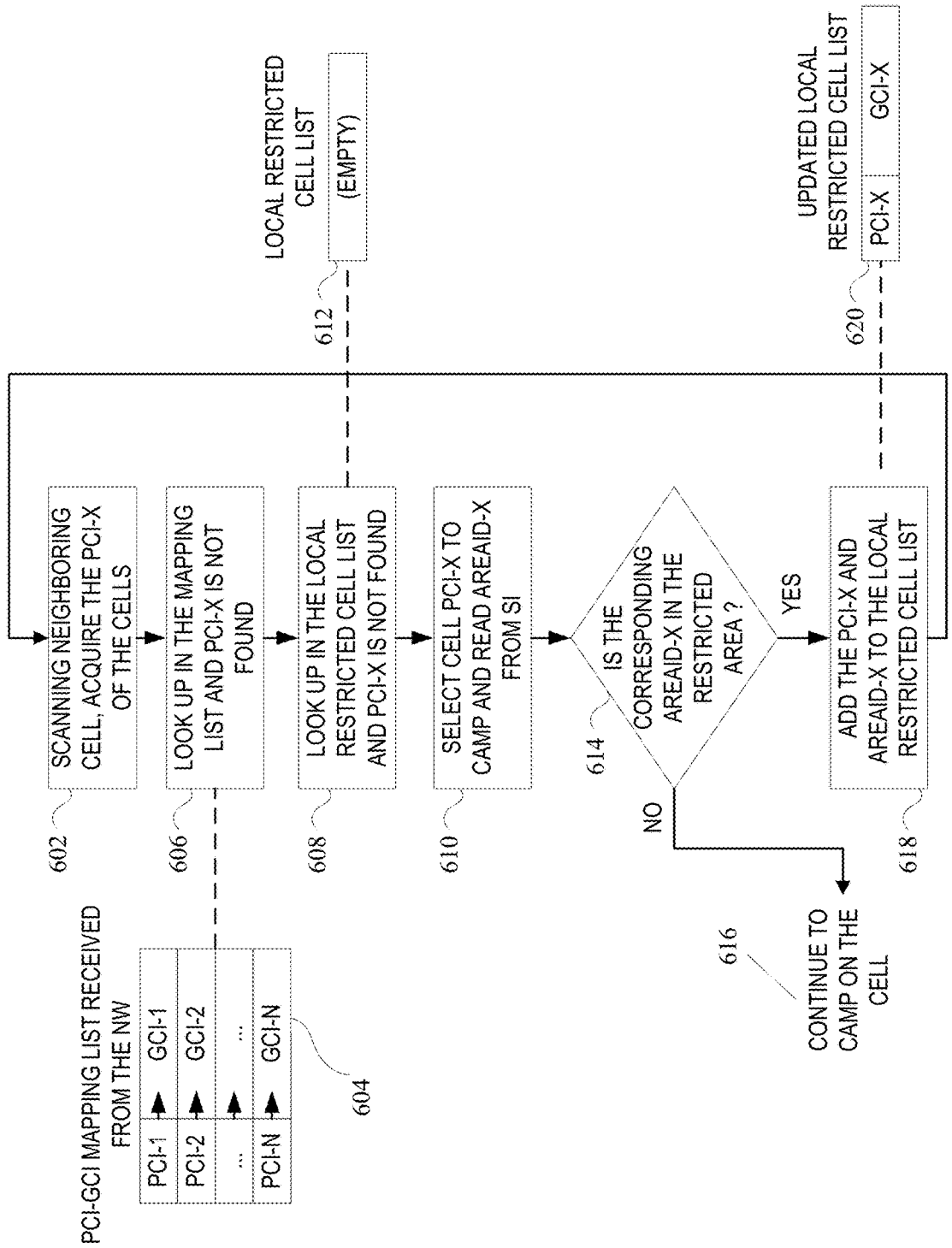
FIG. 6 depicts an example construction of a local restricted cell list.

FIG. 6 depicts an example construction of a local restricted cell list. At 602, a neighboring cell may be scanned. For example, the WTRU and/or Network may scan neighboring cells to acquire the PCIs of the neighboring cells. The WTRU and/or the Network may use one or more Area IDs to acquire the PCIs of the neighboring cells. A PCI-GCI mapping list may be received, at 604. For example, the WTRU may receive the PCI-CGI mapping list from the network. The WTRU may review the mapping list. For example, the WTRU may review the mapping list and a PCI (e.g., a PCI corresponding to an Area ID) may not be found in the mapping list, at 606. The WTRU may review a local restricted cell list. The local restricted cell list may contain one or more entries. The local restricted cell list may be empty, at 612. The WTRU may review the local restricted cell list and the WTRU may not identify a PCI in the local restricted cell list, at 608.

A cell may be selected in which the WTRU may camp, at 610. For example, the WTRU may select a PCI of a cell in which the WTRU is to camp, at 610. The WTRU may identify an Area ID. For example, toe WTRU may identify an Area ID from System Information and the WTRU may select a cell having a PCI that corresponds to the identified Area ID. The WTRU may camp at the selected cell. At 614, it may be determined if the identified Area ID is a restricted Area ID. For example, toe WTRU may check the System Information to determine if the Area ID is a restricted Area ID. If the Area ID is not a restricted Area ID (e.g., based on the System Information), the WTRU may camp on the cell, at 616. If the Area ID is a restricted Area ID (e.g., based on toe System Information), the PCI and/or Area ID corresponding to the Area ID may be added to the local restricted cell list, at 618. The local restricted cell list may be updated. At 620, the Area ID and corresponding PCI and/or GCI may be updated in the local restricted cell list. For example, the Area ID and corresponding PCI and/or GCI may be updated in the local restricted cell list to indicate that the WTRU is in a restricted area. The neighboring cells may be scanned and/or the PCI of the cells may be acquired, at 602.

A network-configured allowed or restricted area list may be changed in the WTRU. For example, the WTRU may compare the restricted cell list (e.g., the local restricted cell list) against the changed (e.g., new) allowed or restricted area list. The WTRU may update the local restricted cell list based on toe changed allowed or restricted area list. For example, if a cell (e.g., PCI-1) is in toe local restricted cell list, and toe cell's corresponding Area ID (AID-1) is in the old restricted area list and is not in the changed (e.g., new) restricted area list, the WTRU may remove the cell (e.g., PCI-1) from the local restricted cell list.

A WTRU may use the local restricted cell list independent of a PCI-Area ID mapping list. For example, the WTRU may use the local restricted cell list independent of the WTRU receiving toe PCI-Area ID mapping list from the network. If the local restricted cell list and the PCI-Area ID mapping list are available, the lists may have some common items (e.g., PCIs). Information for a cell may not be aligned in the lists. For example, Area IDs may not be aligned in the lists. The local restricted cell list may override the PCI-Area ID mapping list. The information in the PCI-Area ID mapping list may be modified. For example, the information in the PCI-Area ID mapping list may be modified to match the local restricted cell list.

One or more restricted area terms may be used. For example, non-allowed area and/or a forbidden area terms may be used, which may be restricted areas. Non-allowed area and/or forbidden area terms may have different restrictions. For example, the Mobility Management signaling, such as Area Update, may be allowed in a non-allowed area and may not be allowed in a forbidden area. A WTRU may construct one or more restricted cell lists. A (e.g., each of the) restricted cell list may correspond to one or more restricted area definitions.

A WTRU may be configured with a maximum number of failed cell selection and/or reselection attempts. For example, the WTRU may be configured with a maximum number of foiled cell selection and/or reselection attempts to avoid repeated selection of restricted cells (e.g., due to mobility restriction). The WTRU may camp on a selected cell and the WTRU may determine that the selected cell is in a restricted area. For example, the WTRU may determine that the selected cell is in a restricted area after the WTRU reads the System Information. When the WTRU determines that toe selected cell is in a restricted area, a counter of the failed cell selection attempts may increase by 1. When the counter reaches a predetermined number (e.g., a maximum number), the WTRU may perform an action. For example, when the counter reaches a predetermined number (e.g., a maximum number), the WTRU may stop (e.g., temporarily stop) attempting to select a cell and the WTRU may remain out of service. If the WTRU selects a cell in an allowed area, the counter may be reset.

The WTRU may start a re-attempt timer. For example, the WTRU may start a re-attempt timer when the counter reaches a number (e.g., a maximum number) of failed cell selection and/or reselection attempts. When the re-attempt timer expires, the WTRU may restart attempting cell selection.

The network may configure the number (e.g., maximum number) of failed cell selection and/or reselection attempts. For example, the network may configure the number (e.g., maximum number) of failed cell selection and/or reselection attempts via NAS signaling. The network may configure the number (e.g., maximum number) of failed cell selection and/or reselection attempts when the WTRU is assigned to a limited mobility level. The network may configure the re-attempt timer. For example, the network may configure the re-attempt timer via NAS signaling. The network may configure the re-attempt timer when the WTRU is assigned to a limited mobility level.

The WTRU may be in a restricted area and/or the WTRU may not be reachable. The WTRU may inform the network if the WTRU is in the restricted area and/or whether the WTRU may not be reachable. For example, if a WTRU is in a restricted area and cannot reselect to an allowed area, the WTRU may inform the network that the WTRU is in the restricted area and/or that the WTRU may not be reachable. The WTRU may initiate a NAS signaling (e.g., a special NAS signaling). For example, the WTRU may initiate a NAS signaling to inform the network that the WTRU is in the restricted area and/or that the WTRU may not be reachable. The network may not reject the special NAS signaling. For example, the network may not reject the special NAS signaling due to mobility restriction. The network may record the information in the WTRU context and/or may propagate the information to one or more (e.g., necessary) CN nodes. The one or more CN nodes may include the UP gateways (GWs) that may be serving the WTRU. The network may suspend one or more of the WTRU's packet data network (PDN) connections.

Figure 7:
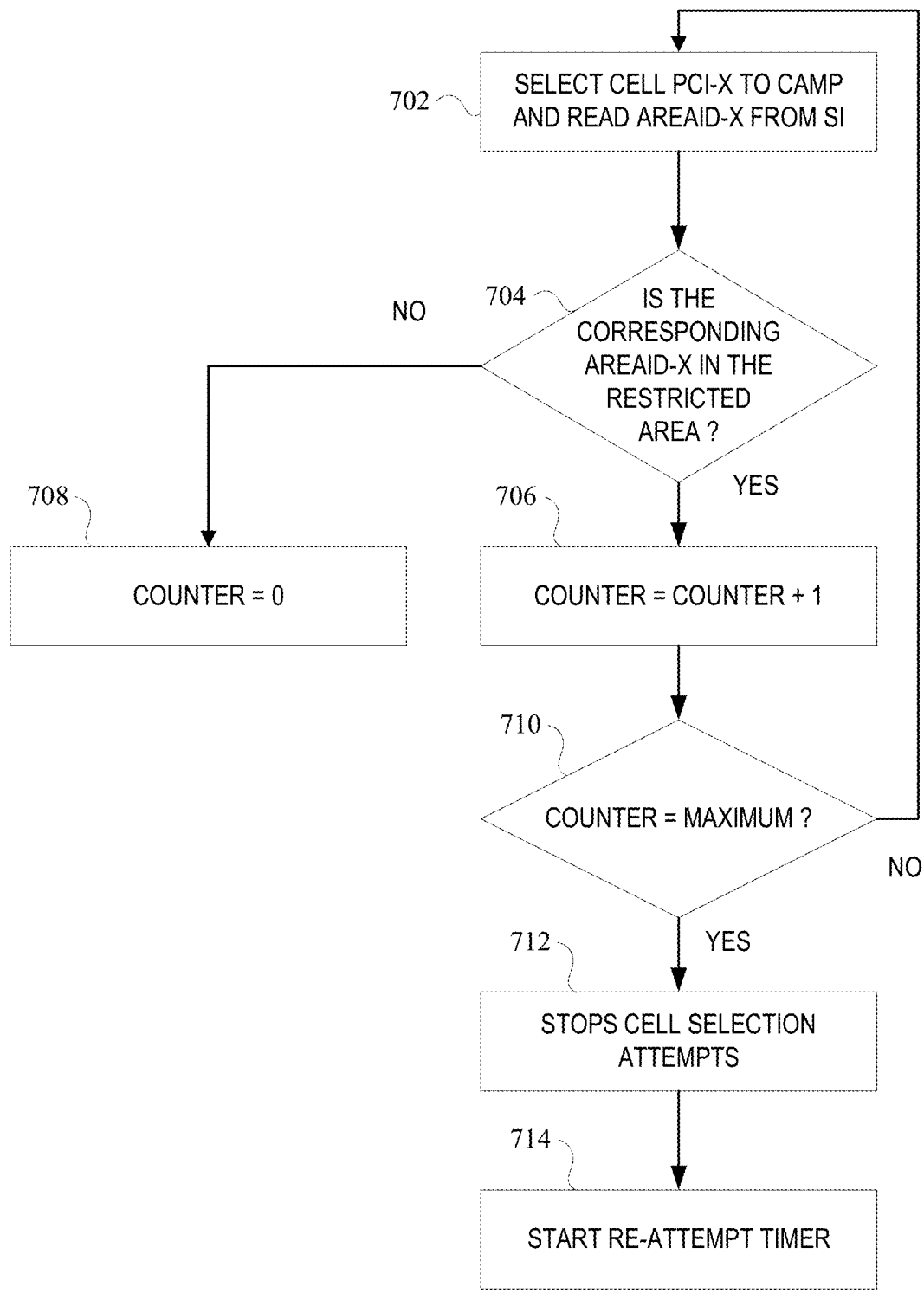
FIG. 7 depicts an example failed cell selection attempt timer and re-attempt timer.

FIG. 7 depicts an example failed cell selection attempt timer and re-attempt timer. A cell PCI may be selected. For example, at 702, a cell PCI may be selected for a cell in which the WTRU may camp. The Area ID of the selected cell may be read. For example, the WTRU may select a cell in which the WTRU is to camp. The WTRU may read the Area ID of the selected cell. For example, the WTRU may read the Area ID from System Information.

It may be determined if the Area ID corresponding to the selected cell is in a restricted area, at 704. For example, a WTRU may determine if the Area ID corresponding to the selected cell PCI is in a restricted area. If the Area ID is not in a restricted area, a counter may be set to zero, at 708. If the Area ID is in a restricted area, the counter may be incremented (e.g., incremented by 1), at 706, and it may be determined if the counter has reached a maximum value, at 710. If the counter has not reached a maximum value, a cell PCI (e.g., another cell PCI) may be selected for which the WTRU may camp and the corresponding Area ID may be read from SI, at 702.

If the counter reaches a maximum value, at 710, cell selection attempts may be stopped, at 712. For example, the WTRU may stop selecting cells. At 714, a re-attempt timer may be started. For example, if the counter has reached a maximum value, the WTRU may start a re-attempt timer after the WTRU stops cell selection attempts. The re-attempt timer may be started after a predetermined time from the WTRU stopping cell selection attempts.

A WTRU may reset and/or refresh an allowed area list. A WTRU may reset and/or refresh an unallowed area list. The WTRU may delete one or more of the PCIs, GCIs, and/or TAIs and/or associated mappings when the WTRU refreshes the allowed or unallowed area list. The WTRU may request an updated list of allowed or unallowed areas from the network. The WTRU may generate an updated list of allowed or unallowed areas. For example, the WTRU may generate an updated list of allowed or unallowed areas based on information from the network, as described hereto.

A WTRU may refresh an area list. For example, a WTRU may refresh an area list when the WTRU detaches from the network. The WTRU may refresh the area list when the network initiates a detach and/or when the WTRU initiates a detach. The WTRU may refresh the area list when implicitly detaching from the network. The WTRU may generate an updated area list. For example, the WTRU may generate an updated area list upon reattaching to the network.

A WTRU may refresh an area list when the WTRU moves into a new geographic location. For example, a WTRU moving into a new geographic location may trigger a new attach and/or an area update with the information associated with the new geographic location. The network may push new area configuration information to the WTRU. For example, the network may push new area configuration information to the WTRU based on the information associated with the new geographic location.

A WTRU may refresh an area list when the WTRU receives a predefined cause code from the network. For example, to response to a NAS mobility management or session management message, a WTRU may refresh an area list when the WTRU receives a predefined cause code from the network. The WTRU may update or reset the area list. For example, the WTRU may update or reset the area list upon the WTRU receiving the predefined cause code from the network. The network may send the predefined cause code when the WTRU sends a NAS message. For example, the network may send the predefined cause code when the WTRU sends a normal and/or a periodic TAU with new WTRU capability (such as switching from MO only transmission mode to bidirectional transmission mode). The network may send the predefined cause code when a session management message and/or a procedure is executed. The session management message and/or procedure may update WTRU session continuity behavior. For example, the session management message and/or procedure may update WTRU session continuity behavior such that the WTRU may be configured for a different SSC (session continuity) mode (e.g., changing from SSC mode 2 to SSC 3). The network may send the predefined cause code when WTRU subscription information changes. For example, the network may send the predefined cause code when WTRU subscription information changes in relation to mobility level support. A change to WTRU subscription information may cause the network to update the mobility level, and the network may send a NAS message (e.g., a mobility management or session management message) with the predefined cause code. The network may send the predefined cause code when the network receives information from a $3^{rd}$ party application server. The information from the $3^{rd}$ party application server may indicate to modify the mobility level of the WTRU and/or modify the area where the WTRU is permitted to perform limited mobility. The network may expose the network capability to the $3^{rd}$ party application servers. For example, the network may expose the network capability to the $3^{rd}$ party application servers via the capability exposure function.

A WTRU and/or the core network may provide information about the allowed and/or unallowed list to the RAN (e.g., RAN node). For example, the WTRU and/or the core network may inform the RAN that the allowed or unallowed list has been reset and/or updated. A WTRU message may not be rejected by the RAN. For example, the WTRU message may not be rejected by the RAN if the RAN is aware of the change in the allowed or unallowed area list. The RAN may configure an area for which the WTRU operates in RAN inactive state. For example, the RAN may configure an area for which the WTRU may operate in RAN inactive state using the allowed or unallowed area list.

The RAN may send predefined cause code information. For example, the RAN may send predefined cause code information via an RRC message. The predefined cause code information may reset and/or update the allowed or unallowed list. For example, the predefined cause code information may reset and/or update the allowed or unallowed list at the WTRU. The predefined cause code information may be sent by the RAN upon receiving the allowed/unallowed area information from the core network. The RRC layer in the WTRU may interact with the NAS layer to inform the RAN about a reset and/or update in the list. For example, the RRC layer in the WTRU may interact with the NAS layer to inform the RAN about a reset and/or update m the list when the WTRU receives the allowed or unallowed list from the RAN. Cross layer information sharing may prevent the NAS layer from generating signaling messages. For example, cross layer information sharing may prevent the NAS layer from generating signaling messages if the WTRU is operating m an unallowed area.

A mobility restriction area mismatch may occur between a WTRU and a network. For example, conditions may lead to a mobility restriction area mismatch occurring between a WTRU and a network. The WTRU may enter a non-allowed area. The WTRU may be unaware that the WTRU entered a non-allowed area. For example, a WTRU may enter a non-allowed area when the WTRU is in an idle mode and the WTRU may be unaware that the WTRU entered a non-allowed area. The WTRU may attempt to establish a user plane in the non-allowed area. A non-allowed area may include a restricted area, an unallowed area, and/or a forbidden area. For example, the WTRU may attempt to establish a user plane by sending a registration message and/or a service request message. The registration message may be a Tracking Area Update and/or a registration request message with a user plane indication (e.g., an active flag).

The WTRU may include an active flag, one or more PDU session IDs, and/or one or more other indications. The active flag, one or more PDU session IDs, and/or one or more other indications may be sent to the network. The active flag, one or more PDU session IDs, and/or one or more other indications may be sent to the network in a registration request message. For example, the WTRU may include an active flag, one or more PDU session ID(s), and/or one or more other indications in the registration request message sent to the network to establish user plane bearers as part of the registration. The WTRU may send the registration request message to an AMF in the network. The network may reject the registration request message. For example, the network may reject the registration request message when the network receives the registration request message with a user plane establishment indication and the network is aware that the WTRU is in the non-allowed area. The network may send a reject message (e.g., a registration reject message) that may include a predefined cause code. For example, the network may send a reject message (e.g., a registration reject message) that may include a predefined cause code to describe the reason for the rejection. The reason for rejection may include the area being not allowed and/or forbidden. When the network receives the registration request message with a user plane establishment indication and the network is aware that the WTRU is in the non-allowed area, the network may accept the registration request message. For example, the network may accept the registration request message and the network may not establish the user plane bearers. The network may update the list of allowed and not-allowed areas. For example, the network may update the list of allowed and not-allowed areas in a registration accept message.

The WTRU may add a registration area to the list of non-allowed areas or forbidden areas. For example, the WTRU may add a current registration area to the list of non-allowed areas or forbidden areas when the WTRU receives a registration accept or reject message from the network. The WTRU may not include an indication to establish a user plane in further registration messages (e.g., periodic registration). For example, the WTRU may not include an indication to establish a user plane in further registration messages (e.g., periodic registration) while the WTRU is in the current area (e.g., in a non-allowed or forbidden area).

The WTRU may send a second registration message without the user plane indication. For example, the WTRU may send a second registration message without the user plate indication if the WTRU receives a registration reject message with a cause code indicating a non-allowed area. The WTRU may update the list of non-allowed areas on the WTRU.

Figure 8:
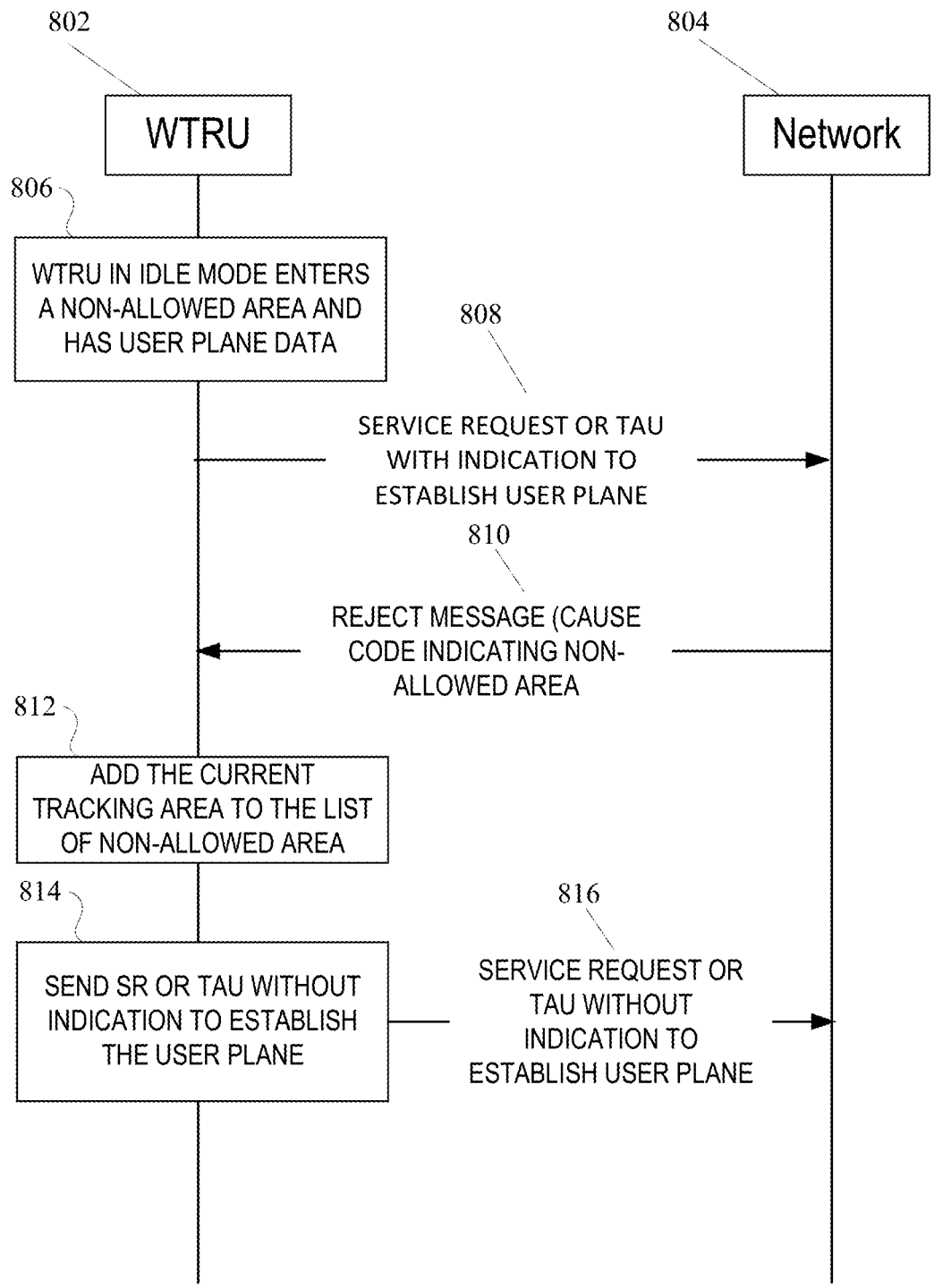
FIG. 8 depicts an example update of a non-allowed area based on receiving a reject message from the network.

FIG. 8 depicts an example update of a non-allowed area based on receiving a reject message from a network (e.g., a network entity). The example update may be based on receiving a reject message from an AMF (Access and Mobility Management Function) of the network entity. A WTRU 802 may be in an idle mode. For example, the WTRU 802 may enter a non-allowed area, at 806, when the WTRU 802 is in an idle mode. The WTRU 802 may have user plane data. WTRU 802 may attempt to establish a user plane using a Service Request message or a TAU, at 808. The WTRU 802 may send a Service Request message and/or a TAU to Network entity 804 (e.g., AMF of the Network entity). For example, the WTRU 802 may send a Service Request (SR) message and/or a TAU to the Network entity 804. The WTRU 802 may send a Service Request (SR) message and/or a TAU to the Network entity 804 so that the WTRU 802 may come out of an idle state while the WTRU 802 is in the non-allowed area. The WTRU 802 may send a Service Request message and/or a TAU so that the WTRU 802 may come out of an idle state while the WTRU 802 is in the non-allowed area if the WTRU 802 is unaware that the current area has been reconfigured by the network entity to be a non-allowed area or forbidden area.

The network entity 804 may reject the Service request message and/or TAU, at 810. The Network entity 804 may include a predefined cause code and/or an area list in the service reject message when the Network entity 804 rejects the Service request message and/or TAU. The Network entity 804 may include a predefined cause code to the service reject message because the WTRU 802 may be unaware that the WTRU 802 is in toe non-allowed area. The cause code may indicate a reason for the service rejection. An example reason may include a user plane being not allowed (e.g., the WTRU is in a non-allowed area and/or a forbidden area). The area list may be a reconfigured area list that indicates one or more allowed areas, non-allowed areas, and/or forbidden areas.

The tracking area (e.g., the current tracking area) may be added to the list of non-allowed areas, at 812. For example, WTRU 802 may add the current tracking area to the list of non-allowed areas. At 814, a Service Request message and/or a TAU may be sent. For example, a Service Request message and/or a TAU may be sent without an indication to establish the User Plane. The Service Request message and/or TAU may be sent from the WTRU 802 to the Network entity 804, at 816. The Service Request message and/or TAU may be sent from the WTRU 802 to the Network entity 804 without an indication to establish a user plane.

The network (e.g., network entity) may send a predefined cause code and/or an area list in the service accept message. For example, the network may send a predefined cause code and/or an area list to the service accept message if a WTRU sends a service request message (e.g., a NAS service request message) to response to paging by the network. The network may not establish a user plane. For example, the network may not establish a user plane if requested by the WTRU. The WTRU may determine that the WTRU is in a non-allowed area. The network may establish (e.g., only establish) a control plane based on the request from the WTRU. For example, the WTRU may determine that the WTRU is in a non-allowed area based on the network not establishing a user plane in response to a service request message.

The WTRU may add the current registration area to a list of non-allowed areas and/or forbidden areas. For example, the WTRU may add the current registration area to a list of non-allowed areas and/or forbidden areas when the WTRU receives a service accept or service reject message. The WTRU may not include an indication to establish a user plane (e.g., include PDU session IDs) in other service request registration messages. For example, the WTRU may not include an indication to establish a user plane (e.g., include PDU session IDs) in other service request registration messages when the WTRU is in the current area.

The WTRU may send one or more service request messages without the user plane indication (e.g., PDU session IDs). For example, the WTRU may send a service request message without the user plane indication (e.g., PDU session IDs) if the WTRU receives a service reject message. The WTRU may receive a service reject message in response to a service request message. The service request message may be sent in response to network paging.

The WTRU may perform a registration. For example, the WTRU may perform a registration to update the WTRU's list of allowed and/or non-allowed areas. The WTRU may perform a registration to update the WTRU's list of allowed and/or non-allowed areas when the WTRU receives a service accept or service reject message.

The WTRU may initiate a Tracking Area Update and/or a Registration update. For example, the WTRU may initiate a Tracking Area Update and/or a Registration update when the WTRU enters an area which is configured as allowed or non-allowed area and at the network side has been changed to a forbidden area. The WTRU may receive a TAU Reject and/or a Registration Reject message with an indication (e.g., a predefined cause code) that the area is forbidden. The WTRU may add the area to a configured forbidden area list and/or the WTRU may update the WTRU's allowed area or non-allowed area. The TAU Reject and/or Registration Reject message may include an updated list of allowed areas, non-allowed areas, and/or forbidden areas. The WTRU may update one or more local configurations with the updated lists of allowed areas, non-allowed areas, and/or forbidden areas.

The WTRU may not include one or more PDU session IDs and/or a user plane indication similar to an active flag (e.g., when sending a registration update). For example, the WTRU may not include one or more PDU session IDs and/or a user plane indication similar to an active flag (e.g., when sending a registration update) when the WTRU is in the non-allowed area. For example, when the WTRU is aware that the WTRU is in a non-allowed area, the WTRU may not include one or more PDU session IDs (e.g., when sending Service request message) and/or a user plane indication similar to an active flag (e.g., when sending registration update).

A WTRU may move into a restricted area. For example, a WTRU in an RRC INACTIVE state may move from an allowed area to a restricted area.

The WTRU may determine whether the WTRU is in an allowed area or a restricted area. For example, if the WTRU was assigned a Restricted Mobility level (e.g., before entering an RRC INACTIVE state), the WTRU may determine whether the WTRU is in an allowed area or a restricted area. The WTRU may determine whether the WTRU is in an allowed area or a restricted area when the WTRU is in the RRC INACTIVE state and the WTRU enters a new cell or area. If the WTRU determines that the WTRU is in a restricted area, the WTRU may switch (e.g., immediately switch) to an RRC IDLE state. The WTRU may switch (e.g., immediately switch) to an RRC IDLE state without any RRC signaling (e.g., explicit RRC signaling) between the WTRU and the Network (NW) and/or RAN. A state switch from the RRC INACTIVE state to the IDLE state may be transparent to the RAN and/or Network. For example, the RAN and/or Network may maintain the WTRU context and/or CP/UP connection following the state switch.

The RAN may attempt to reach the WTRU. For example, the RAN may attempt to reach the WTRU following a state switch. The RAN may attempt to reach the WTRU by paging and/or sending a notification. For example, the RAN may attempt to reach the WTRU by paging and/or sending a notification via a physical layer signal. The WTRU may not respond to the RAN's attempt to reach the WTRU. The WTRU may not respond to the paging and/or the notification. The RAN may remove the WTRU context and/or may initiate the NG2 connection release. For example, based on no response from the WTRU, the RAN may remove the WTRU context and/or may initiate the NG2 connection release.

Figure 9:
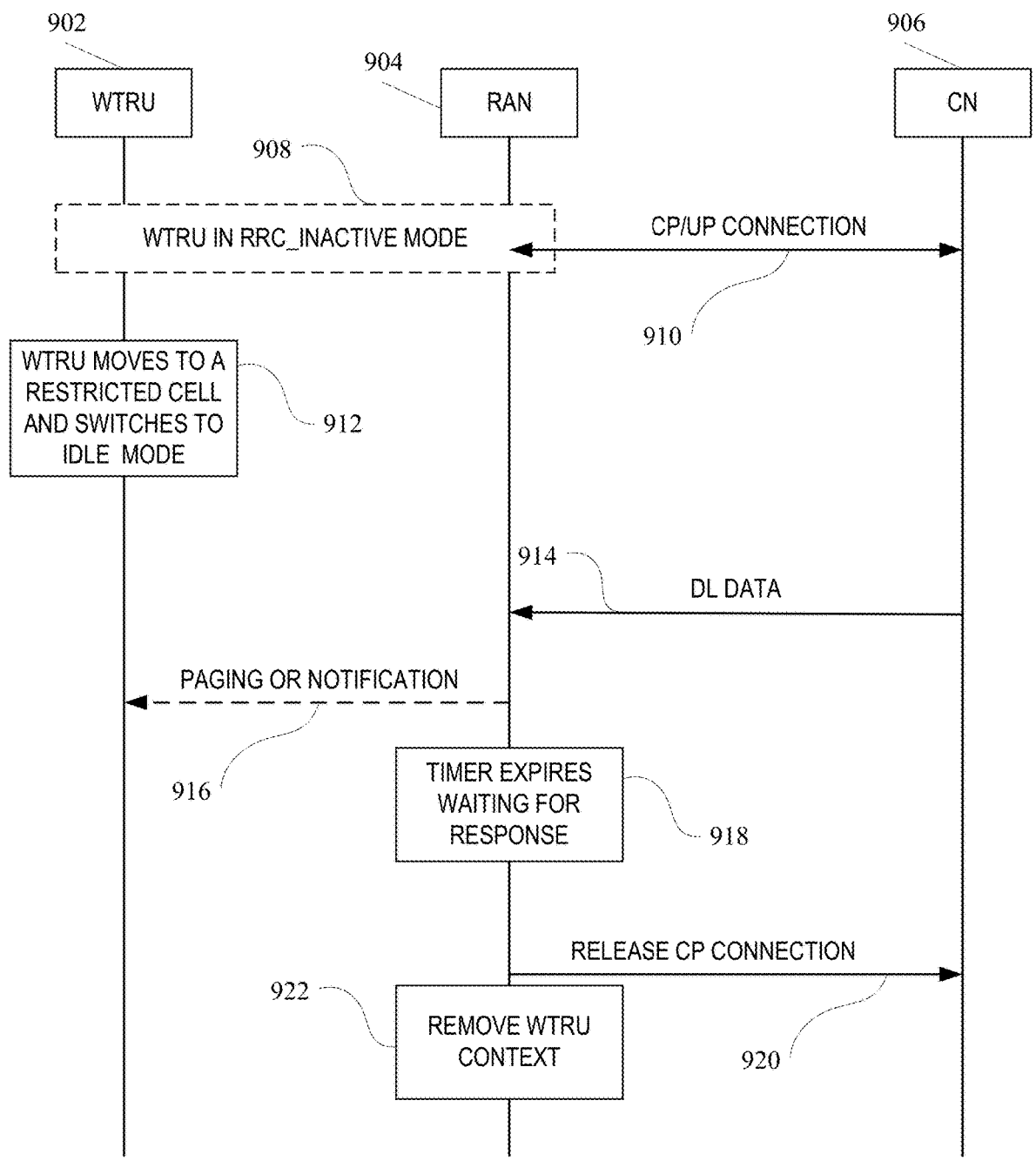
FIG. 9 depicts an example WTRU switching to idle after moving to a restricted area.

FIG. 9 is a messaging chart depicting an example WTRU 902 switching to an idle state after moving to a restricted area. The WTRU may move back to an allowed area after the WTRU has switched to the IDLE state. The WTRU may move back to an allowed area before, or after, the RAN removes the WTRU context. If the WTRU moves back to an allowed area before the RAN removes the WTRU context, there may be a discrepancy between the WTRU and toe RAN/CN in terms of the WTRU's RRC state.

As shown at 908, the WRU may be in an RRC_INACTIVE state (e.g., an RRC_INACTIVE mode). The RAN 904 and the CN 906 may perform a CP/UP connection, at 910. For example, the RAN 904 and the CN 906 may perform a CP/UP connection when the WTRU 902 is in the RRC_INACTIVE state. The WTRU 902 may have switched to an IDLE state while the RAN 904 determines whether the WTRU 902 is in an RRC INACTIVE state. The discrepancy may be resolved. For example, the discrepancy may be resolved when the WTRU 902 in IDLE state initiates an RRC connection establishment towards the RAN 904, and the WTRU 902 and the RAN 904 switched to full CONNECTED mode based on the RRC connection establishment.

The WTRU 902 may move to a restricted cell, at 912. The WTRU 902 may move to a restricted cell (e.g., area) and/or the WTRU 902 may switch to idle mode. The WTRU 902 may remain in an INACTIVE state and the WTRU 902 may send a signal to the RAN 904 indicating that the WTRU 902 is to a restricted area. The WTRU 902 may send the signal to the RAN 904 proactively or to response to the RAN's paging or notification. For example, CN 906 may send downlink (DL) data to the RAN 904, at 914. The RAN 904 may send a paging or a notification to the WTRU 902, as shown to 916. The RAN 904 may send a paging or a notification to the WTRU 902, based on the RAN 904 receiving the DL data. The WTRU 902 may send the signal to the RAN 904 indicating that the WTRU 902 is in a restricted area, based on the WTRU 902 receiving the RAN's paging or notification.

A timer may be set. For example, a timer may be set by the RAN node 904. The timer may expire if the response to the paging or notification message is not received from the WTRU 902 within a predetermined time, as shown in 918. The CP connection may be released. For example, the CP connection may be released, at 920, if the timer expires. The WTRU context may be removed, at 922. For example, the WTRU context may be removed if the CP connection is released.

The WTRU 902 may remain in an INACTIVE state and the WTRU may send a signal to the RAN. The signal may indicate that the WTRU is in a restricted area. The WTRU may send the signal to the RAN proactively or the WTRU may send the signal to the RAN to response to the RAN's paging or notification.

The RAN may command the WTRU to remain in an INACTIVE state or transition to an IDLE state. For example, the RAN may command the WTRU to remain to an INACTIVE state or transition to an IDLE state based on receiving the signal indicating that the WTRU is in a restricted area.

The RAN may request the WTRU to enter an IDLE state. For example, when the RAN requests the WTRU to enter an IDLE state, toe RAN may remove one or more (e.g., any) local WTRU context and/or may release the NG2 control plane connection.

The RAN may request the WTRU to remain in an INACTIVE slate. When the RAN requests toe WTRU to enter an IDLE state, the RAN may initiate a PDU session suspension. For example, the RAN may initiate a PDU session suspension through the existing CP connection. The RAN may initiate a PDU session suspension through the existing CP connection such that the CN will not forward toe downlink data to the RAN. The CN may buffer and/or drop the incoming downlink data.

When the WTRU moves back to an allowed area and the WTRU's state is an INACTIVE state, the WTRU may send a signal to the RAN indicating that the WTRU is to an allowed area. The RAN may initiate one or more CN procedures to resume the WTRU's PDU connection. For example, the RAN may initiate one or more CN procedures to resume the WTRU's PDU connection that was previously suspended).

Figure 10:
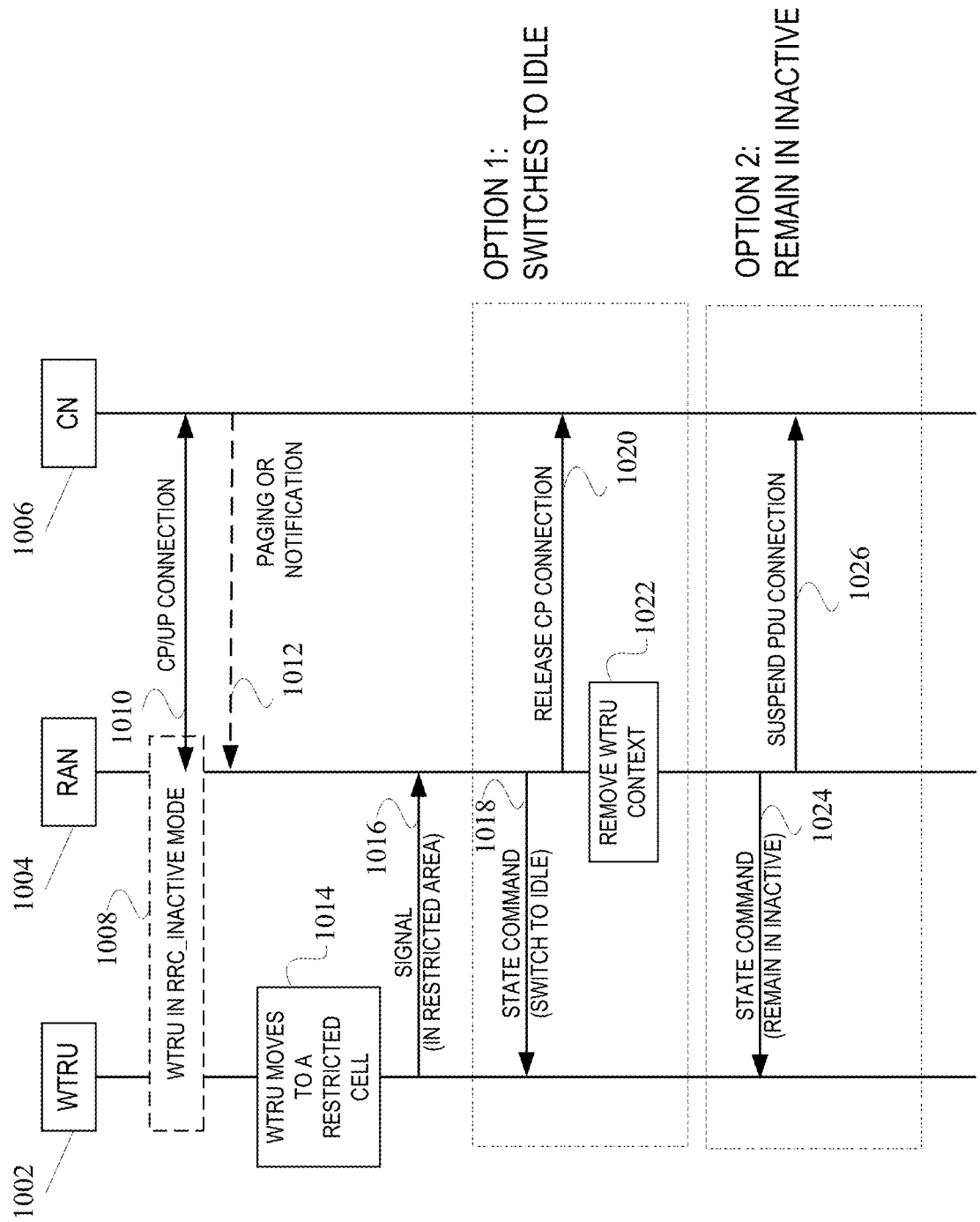
FIG. 10 depicts an example WTRU signaling to the network that it is in a restricted area.

FIG. 10 is a messaging chart depicting an example WTRU signaling to the network that the WTRU is in a restricted area. The WTRU 1002 may be in an RRC_INACTIVE state (e.g., RRC_INACTIVE mode), as shown in 1008. The RAN 1004 and the CN 1006 may perform a CP/UP connection, at 1010. For example, the RAN 1004 and the CN 1006 may perform a CP/UP connection when the WTRU 1002 is in the RRC_INACTIVE state. The CN 1006 may send a paging or notification. For example, the CN 1006 may send a paging or notification to RAN 1004, at 1012. The WTRU 1002 may move to a restricted cell (e.g., restricted area), at 1014. The WTRU 1002 may send a signal to the RAN 1004. For example, the WTRU 1002 may send a signal to the RAN 1004, at 1016. The signal may indicate that the WTRU 1002 is in a restricted cell.

One or more actions may occur, based on the RAN 1004 receiving the signal from the WTRU 1002. For example, the WTRU 1002 may switch to an idle mode (e.g., option 1, as shown on FIG. 10). The RAN 1004 may indicate to the WTRU 1002 for the WTRU 1002 to switch to an idle mode, at 1018. For example, the indication may be a state command from the RAN 1004 to the WTRU 1002. The RAN 1004 may indicate to the CN 1006 to release the CP connection, at 1020. The WTRU context may be removed, at 1022.

The WTRU 1002 may remain in inactive mode (e.g., option 2, as shown on FIG. 10). The RAN 1004 may indicate to WTRU 1002 for the WTRU 1002 to remain in an inactive mode, at 1024. For example, the indication may be a state command from the RAN 1004 to the WTRU 1002. The RAN 1004 may indicate to the CN 1006 to suspend the PDU connection, at 1026.

The WTRU may remain in an INACTIVE state and may initiate a NAS procedure (e.g., to suspend the WTRU's PDU connections). The RAN may be transparent to the NAS procedure. Although a WTRU may not (e.g., should not) initiate a NAS signaling from a restricted area, the Network may not reject the PDU session suspension request (e.g., make it an exception).

The WTRU may move back to an allowed area. When the WTRU moves back to an allowed area and the WTRU is in an INACTIVE state, the WTRU may initiate a NAS procedure to resume the suspended PDU connections.

Although features and elements are described above in particular combinations, one of ordinary skill in the art will appreciate that each feature or element can be used alone a in any combination with the other features and elements. In addition, the methods described herein may be implemented in a computer program, software, a firmware incorporated in a computer-readable medium for execution by a computer a processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a redo frequency transceiver for use in a WTRU, WTRU, terminal, base station. RNC, or any host computer.

What is claimed:

1. A network node comprising:
   a processor configured to:
   receive a first request message from a wireless transmit/receive unit (WTRU), the first request message comprising an indication to establish a user plane;
   determine that the WTRU is located in a non-allowed area; and
   based on the determination that the WTRU is in the non-allowed area, send a first response message to the first request message, the first response message comprising an indication that the WTRU is located in the non-allowed area and an indication that the network node is preventing the user plane from being established in the non-allowed area; and
   receive a second request message without the indication to establish the user plane, wherein the second request message is sent by the WTRU in response to the indication that the WTRU is located in the non-allowed area.

2. The network node of claim 1, wherein the second request message comprises a registration message.

3. The network node of claim 1, wherein the processor is configured to update a tracking area list (TAU) associated with a location of the WTRU based on the determination that the WTRU is in the non-allowed area.

4. The network node of claim 1, wherein the processor is configured to:
   determine whether a location of the WTRU has been changed;
   based on a determination that the location of the WTRU has been changed, determine whether the changed location of the WTRU is in an allowed area or a non-allowed area;
   based on a determination that the changed location of the WTRU is in the allowed area, send a second response message to the WTRU, the second response message comprising an indication that the WTRU is located in the allowed area and an indication that the WTRU is allowed to send a request to establish the user plane; and
   on a conditionbased on a determination that the changed location of the WTRU is in the non-allowed area, send the second response message to the WTRU, the second response message comprising an indication that the WTRU is located in the non-allowed area and an indication that the network node is preventing the user plane from being established in the non-allowed area.

5. The network node of claim 4, wherein the processor is configured to:
   receive a third request message from the WTRU without the indication to establish the user, wherein the third request message comprises a registration message, and wherein the third request message is sent by the WTRU in response to receiving the second response message.

6. The network node of claim 1, wherein the processor is configured to:
   determine whether a location of the WTRU has been changed;

based on a determination that the location of the WTRU has been changed, determine whether the changed location of the WTRU is in the allowed area or the non-allowed area; and send a WTRU location update message to a radio access node (RAN), the WTRU location update message indicating that the changed location of the WTRU is in the allowed area or the non-allowed area.

7. The network node of claim 1, wherein the first request message comprises a service request message.

8. The network node of claim 1, wherein the processor is configured to periodically determine whether a location of the WTRU has been changed.

9. The network node of claim 1, wherein the network node comprises an access and mobility management function (AMF).

10. A method performed by a network node, the method comprising:
receiving a first request message from a wireless transmit/receive unit (WTRU), the first request message comprising an indication to establish a user plane;
determining that the WTRU is located in a non-allowed area; and
based on the determination that the WTRU is in the non-allowed area, sending a first response message to the first request message, the first response message comprising an indication that the WTRU is located in the non-allowed area and an indication that the network node is preventing the user plane from being established in the non-allowed area; and
receiving a second request message without the indication to establish the user plane, wherein the second request message is sent by the WTRU in response to the indication that the WTRU is located in the non-allowed area.

11. The method of claim 10, wherein the second request message comprises a registration message.

12. The method of claim 10, further comprising updating a tracking area list (TAU) associated with a location of the WTRU based on the determination that the WTRU is in the allowed area or the non-allowed area.

13. The method of claim 10, further comprising:
determining whether a location of the WTRU has been changed;
based on a determination that the location of the WTRU has been changed, determining whether the changed location of the WTRU is in an allowed area or a non-allowed area;
based on a determination that the changed location of the WTRU is in an allowed area, sending a second response message to the WTRU, the second response message comprising an indication that the WTRU is located in the allowed area and an indication that the WTRU is allowed to send a request to establish the user plane; and based on a determination that the changed location of the WTRU is in a non-allowed area, sending the second response message to the WTRU, the second response message comprising an indication that the WTRU is located in the non-allowed area and an indication that the network node is preventing the user plane from being established in the non-allowed area.

14. The method of claim 13, further comprising eceiving a third request message from the WTRU without the indication to establish the user plane, wherein the third request message comprises a registration message, and wherein the third request message is sent by the WTRU in response to receiving the second response message.

15. The method of claim 13, further comprising eceiving a third request message from the WTRU including an indication to establish the user plane, wherein the third request message comprises a registration message, and wherein the third request message is sent by the WTRU in response to receiving the second response message.

16. The method of claim 10, further comprising:
determining whether a location of the WTRU has been changed;
based on a determination that the location of the WTRU has been changed, determining whether the changed location of the WTRU is in an allowed area or a non-allowed area; and
sending a WTRU location update message to a radio access node (RAN), the WTRU location update message indicating that the changed location of the WTRU is in the allowed area or the non-allowed area.

17. The method of claim 10, wherein the first request message comprises a service request message.

18. The method of claim 10, further comprising periodically determining whether a location of the WTRU has been changed.

19. The method of claim 10, wherein the network node comprises an access and mobility management function (AMF).

20. A wireless transmit/receive unit (WTRU) comprising:
a processor configured to:
send a first request message to a network node, the first request message comprising an indication to establish a user plane;
receive a response message to the first request message, the response message comprising an indication that the WTRU is located in a non-allowed area and an indication that the network node is preventing the user plane from being established in the non-allowed area; and
send a second request message without the indication to establish the user plane in response to receiving the indication that the WTRU is located in the non-allowed area.

* * * * *